(12) United States Patent
Nam et al.

(10) Patent No.: US 11,696,273 B2
(45) Date of Patent: Jul. 4, 2023

(54) BEAM SWITCHING CAPABILITY FOR SYSTEMS WITH HIGH SUBCARRIER SPACING

(71) Applicant: QUALCOMM Incorporated, San Diego, CA (US)

(72) Inventors: Wooseok Nam, San Diego, CA (US); Tao Luo, San Diego, CA (US); Xiaoxia Zhang, San Diego, CA (US); Jing Sun, San Diego, CA (US); Zhifei Fan, San Diego, CA (US); Juan Montojo, San Diego, CA (US); Sungwoo Park, Seoul (KR); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/225,890

(22) Filed: Apr. 8, 2021

(65) Prior Publication Data
US 2021/0321382 A1 Oct. 14, 2021

Related U.S. Application Data

(60) Provisional application No. 63/008,580, filed on Apr. 10, 2020.

(51) Int. Cl.
*H04W 72/04* (2023.01)
*H04W 72/044* (2023.01)
(Continued)

(52) U.S. Cl.
CPC ......... *H04W 72/046* (2013.01); *H04W 8/22* (2013.01); *H04W 72/0446* (2013.01)

(58) Field of Classification Search
CPC .. H04W 72/046; H04W 8/22; H04W 72/0446
See application file for complete search history.

(56) References Cited

U.S. PATENT DOCUMENTS

2019/0103947 A1* 4/2019 Park ..................... H04L 1/1854
2019/0132882 A1* 5/2019 Li ..................... H04W 74/0816
(Continued)

OTHER PUBLICATIONS

VIVO: "Views on Remaining Rel-15 UE Features," 3GPP Draft, 3GPP TSG RAN WG1 Meeting #94bis, R1-1810374, 3rd Generation Partnership Project (3GPP), RAN WG1, Chengdu, China; Oct. 8, 2018-Oct. 12, 2018, Sep. 29, 2018, 21 pages (Year: 2018).*
(Continued)

*Primary Examiner* — Lan-Huong Truong
(74) *Attorney, Agent, or Firm* — Holland & Hart LLP

(57) ABSTRACT

Methods, systems, and devices for wireless communications are described. A user equipment (UE) may identify a beam switching capability for a subcarrier spacing for communications between the UE and a base station. In one example, the beam switching capability may indicate a quantity of beam switches for a plurality of slots of a transmission time interval. In another example, the capability may indicate a threshold quantity of symbol periods between beam switching operations associated with the subcarrier spacing, or a beam switching time for the subcarrier spacing, or both. The UE may determine, for the identified beam switching capability, one or more parameter values that indicate the identified beam switching capability. The parameters may explicitly or implicitly indicate the identified capability. The UE may also transmit the determined one or more parameter values to the base station and communicate with the base station according to the identified beam switching capability.

28 Claims, 15 Drawing Sheets

(51) Int. Cl.
*H04W 72/0446* (2023.01)
*H04W 8/22* (2009.01)

(56) References Cited

U.S. PATENT DOCUMENTS

| | | | |
|---|---|---|---|
| 2019/0260456 A1 | 8/2019 | Zhou et al. | |
| 2019/0394634 A1* | 12/2019 | Akkarakaran | H04B 7/0617 |
| 2020/0021351 A1* | 1/2020 | Tang | H04B 7/0617 |
| 2020/0178280 A1* | 6/2020 | Guan | H04B 7/088 |
| 2021/0083748 A1* | 3/2021 | Guan | H04B 17/309 |

OTHER PUBLICATIONS

"3rd Generation Partnership Project; Technical Specification Group Radio Access Network; NR; User Equipment (UE) Radio Access Capabilities (Release 16)" 3GPP Standard; Technical Specification; 3GPP TS 38.306, 3rd Generation Partnership Project (3GPP), Mobile Competence Centre, 650, Route Des Lucioles, F-06921, Sophia-Antipolis Cedex, France, vol. RAN WG2, No. V16.0.0, Apr. 8, 2020 (Apr. 8, 2020), pp. 1-64, XP051893892, Retrieved from the Internet: URL: http://ftp.3gpp.org/Specs/archive/38_series/38.306/ 38306-g00.zip 38306-g00.docx [retrieved on Apr. 8, 2020] pp. 20, 24.
International Search Report and Written Opinion—PCT/US2021/ 026677—ISA/EPO—dated Jun. 29, 2021.
VIVO: "Views on Remaining Rel-15 UE Features," 3GPP Draft, 3GPP TSG RAN WG1 Meeting #94bis, R1-1810374, 3rd Generation Partnership Project (3GPP), RAN WG1, Chengdu, China; Oct. 8, 2018-Oct. 12, 2018, Sep. 29, 2018, 21 pages.

\* cited by examiner

BEAM SWITCHING CAPABILITY FOR SYSTEMS WITH HIGH SUBCARRIER SPACING

CROSS REFERENCE

The present application for patent claims the benefit of U.S. Provisional Patent Application No. 63/008,580 by Nam et al., entitled "BEAM SWITCHING CAPABILITY FOR SYSTEMS WITH HIGH SUBCARRIER SPACING," filed Apr. 10, 2020, assigned to the assignee hereof, and expressly incorporated by reference herein.

FIELD OF TECHNOLOGY

The following relates generally to wireless communications and more specifically to beam switching capability for systems with high subcarrier spacing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Devices of a wireless communications system, such as UEs and base stations, may support beamforming to enhance communication reliability and efficiency using directional signal transmission. These devices may switch between various directional beams during a transmission period, and the ability to efficiently switch between beams may be limited by the hardware of a device. Thus, base stations may schedule communications for the UE to account for the hardware limitations.

SUMMARY

The described techniques relate to improved methods, systems, devices, and apparatuses that support beam switching capability for systems with high subcarrier spacing. Generally, the described techniques provide for enhanced beam switch capability reporting. A user equipment (UE) may identify a beam switching capability for a subcarrier spacing of a set of subcarrier spacings for communications between the UE and a base station. In one example, the beam switching capability may indicate a quantity of beam switches for a plurality of slots of a transmission time interval. In another example, the capability may indicate a threshold quantity of symbol periods between beam switching operations associated with the subcarrier spacing, or a beam switching time for the subcarrier spacing, or both. The UE may determine, for the identified beam switching capability, one or more parameter values that indicate the identified beam switching capability. The parameters may explicitly or implicitly indicate the identified capability. The UE may also transmit, in UE capability signaling, the determined one or more parameter values to the base station and communicate with the base station according to the identified beam switching capability.

A method of wireless communications at a UE is described. The method may include identifying a beam switching capability for a subcarrier spacing of a set of subcarrier spacings for communications between the UE and a base station, the beam switching capability indicating a quantity of beam switches for a set of slots of a transmission time interval, determining, for the identified beam switching capability, one or more parameter values that indicate the identified beam switching capability, transmitting, in UE capability signaling, the determined one or more parameter values to the base station, and communicating with the base station according to the identified beam switching capability.

An apparatus for wireless communications at a UE is described. The apparatus may include a processor, memory coupled with the processor, and instructions stored in the memory. The instructions may be executable by the processor to cause the apparatus to identify a beam switching capability for a subcarrier spacing of a set of subcarrier spacings for communications between the UE and a base station, the beam switching capability indicating a quantity of beam switches for a set of slots of a transmission time interval, determine, for the identified beam switching capability, one or more parameter values that indicate the identified beam switching capability, transmit, in UE capability signaling, the determined one or more parameter values to the base station, and communicate with the base station according to the identified beam switching capability.

Another apparatus for wireless communications at a UE is described. The apparatus may include means for identifying a beam switching capability for a subcarrier spacing of a set of subcarrier spacings for communications between the UE and a base station, the beam switching capability indicating a quantity of beam switches for a set of slots of a transmission time interval, determining, for the identified beam switching capability, one or more parameter values that indicate the identified beam switching capability, transmitting, in UE capability signaling, the determined one or more parameter values to the base station, and communicating with the base station according to the identified beam switching capability.

A non-transitory computer-readable medium storing code for wireless communications at a UE is described. The code may include instructions executable by a processor to identify a beam switching capability for a subcarrier spacing of a set of subcarrier spacings for communications between the UE and a base station, the beam switching capability indicating a quantity of beam switches for a set of slots of a transmission time interval, determine, for the identified beam switching capability, one or more parameter values that indicate the identified beam switching capability, transmit, in UE capability signaling, the determined one or more parameter values to the base station, and communicate with the base station according to the identified beam switching capability.

In some examples of the method, apparatuses, and non-transitory computer-readable medium described herein, determining the one or more parameter values may include operations, features, means, or instructions for determining a value for a first parameter indicating the quantity of beam switches, and determining a value for a second parameter indicating a number of slots of the set of slots, where the value for the first parameter and the value of the second parameter may be transmitted to the base station.

In some examples of the method, apparatuses, and non-transitory computer-readable medium described herein, determining the one or more parameter values may include operations, features, means, or instructions for identifying the quantity of beam switches for the set of slots based on a reference subcarrier spacing, where the one or more parameter values indicate the quantity of beam switches for the set of slots based on the reference subcarrier spacing.

In some examples of the method, apparatuses, and non-transitory computer-readable medium described herein, the reference subcarrier spacing may be indicated by the one or more parameter values.

In some examples of the method, apparatuses, and non-transitory computer-readable medium described herein, the reference subcarrier spacing may be a default reference subcarrier spacing.

In some examples of the method, apparatuses, and non-transitory computer-readable medium described herein, determining the one or more parameter values may include operations, features, means, or instructions for identifying the quantity of beam switches for the set of slots based on a reference time duration, where the one or more parameter values indicate the quantity of beam switches for the set of slots based on the reference time duration.

In some examples of the method, apparatuses, and non-transitory computer-readable medium described herein, the reference time duration may be indicated by the one or more parameter values.

In some examples of the method, apparatuses, and non-transitory computer-readable medium described herein, the reference time duration may be a default reference time duration.

In some examples of the method, apparatuses, and non-transitory computer-readable medium described herein, the reference time duration may be a 0.125 milliseconds time duration.

In some examples of the method, apparatuses, and non-transitory computer-readable medium described herein, transmitting the determined one or more parameter values may include operations, features, means, or instructions for transmitting the determined one or more parameter values using radio resource control signaling.

Some examples of the method, apparatuses, and non-transitory computer-readable medium described herein may further include operations, features, means, or instructions for transmitting, in the UE capability signaling, one or more parameter values that indicate an identified beam switching capability for each subcarrier spacing of the set of subcarrier spacings.

In some examples of the method, apparatuses, and non-transitory computer-readable medium described herein, the transmission time interval may be a 1 millisecond subframe transmission time interval.

In some examples of the method, apparatuses, and non-transitory computer-readable medium described herein, the one or more parameter values indicate the quantity of reception beam switches, the quantity of transmission beam switches, or both.

A method of wireless communications at a UE is described. The method may include identifying a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both, determining, for the identified beam switching capability, one or more parameter values that indicate the identified beam switching capability, transmitting an indication of the determined one or more parameter values to the base station, and communicating with the base station according to the identified beam switching capability.

An apparatus for wireless communications at a UE is described. The apparatus may include a processor, memory coupled with the processor, and instructions stored in the memory. The instructions may be executable by the processor to cause the apparatus to identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both, determine, for the identified beam switching capability, one or more parameter values that indicate the identified beam switching capability, transmit an indication of the determined one or more parameter values to the base station, and communicate with the base station according to the identified beam switching capability.

Another apparatus for wireless communications at a UE is described. The apparatus may include means for identifying a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both, determining, for the identified beam switching capability, one or more parameter values that indicate the identified beam switching capability, transmitting an indication of the determined one or more parameter values to the base station, and communicating with the base station according to the identified beam switching capability.

A non-transitory computer-readable medium storing code for wireless communications at a UE is described. The code may include instructions executable by a processor to identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both, determine, for the identified beam switching capability, one or more parameter values that indicate the identified beam switching capability, transmit an indication of the determined one or more parameter values to the base station, and communicate with the base station according to the identified beam switching capability.

In some examples of the method, apparatuses, and non-transitory computer-readable medium described herein, transmitting the determined one or more parameter values may include operations, features, means, or instructions for transmitting the determined one or more parameter values using radio resource control signaling.

Some examples of the method, apparatuses, and non-transitory computer-readable medium described herein may further include operations, features, means, or instructions for transmitting, in the UE capability signaling, one or more parameter values that indicate an identified beam switching capability for each subcarrier spacing of the set of subcarrier spacings.

In some examples of the method, apparatuses, and non-transitory computer-readable medium described herein, the one or more parameter values indicate the beam switching capability for reception beams, transmission beams, or both.

A method of wireless communications at a base station is described. The method may include identifying a subcarrier spacing of a set of subcarrier spacings for communications between the base station and a UE, receiving, from the UE, one or more parameter values that indicate a beam switching capability of the UE corresponding to the subcarrier spacing, the beam switching capability indicating a quantity of beam switches for a set of slots, and communicating with the UE based on the indicated beam switching capability.

An apparatus for wireless communications at a base station is described. The apparatus may include a processor, memory coupled with the processor, and instructions stored in the memory. The instructions may be executable by the processor to cause the apparatus to identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a quantity of beam switches for a set of slots, and communicate with the UE based on the indicated beam switching capability.

Another apparatus for wireless communications at a base station is described. The apparatus may include means for identifying a subcarrier spacing of a set of subcarrier spacings for communications between the base station and a UE, receiving, from the UE, one or more parameter values that indicate a beam switching capability of the UE corresponding to the subcarrier spacing, the beam switching capability indicating a quantity of beam switches for a set of slots, and communicating with the UE based on the indicated beam switching capability.

A non-transitory computer-readable medium storing code for wireless communications at a base station is described. The code may include instructions executable by a processor to identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a quantity of beam switches for a set of slots, and communicate with the UE based on the indicated beam switching capability.

In some examples of the method, apparatuses, and non-transitory computer-readable medium described herein, receiving the one or more parameter values may include operations, features, means, or instructions for receiving a first value for a first parameter indicating the quantity of beam switches, and receiving a value for a second parameter indicating a number of slots of the set of slots, where the value for the first parameter and the value of the second parameter may be transmitted to the base station.

Some examples of the method, apparatuses, and non-transitory computer-readable medium described herein may further include operations, features, means, or instructions for identifying the quantity of beam switches for the set of slots based on a reference subcarrier spacing, where the one or more parameter values indicate the quantity of beam switches for the set of slots based on the reference subcarrier spacing.

In some examples of the method, apparatuses, and non-transitory computer-readable medium described herein, the reference subcarrier spacing may be indicated by the one or more parameter values.

In some examples of the method, apparatuses, and non-transitory computer-readable medium described herein, the reference subcarrier spacing may be a default reference subcarrier spacing.

Some examples of the method, apparatuses, and non-transitory computer-readable medium described herein may further include operations, features, means, or instructions for identifying the quantity of beam switches for the set of slots based on a reference time duration, where the one or more parameter values indicate the quantity of beam switches for the set of slots based on the reference time duration.

In some examples of the method, apparatuses, and non-transitory computer-readable medium described herein, the reference time duration may be indicated by the one or more parameter values.

In some examples of the method, apparatuses, and non-transitory computer-readable medium described herein, the reference time duration may be a default reference time duration.

In some examples of the method, apparatuses, and non-transitory computer-readable medium described herein, the reference time duration may be a 0.125 millisecond time duration.

In some examples of the method, apparatuses, and non-transitory computer-readable medium described herein, receiving the one or more parameter values may include operations, features, means, or instructions for receiving the one or more parameter values using radio resource control signaling.

Some examples of the method, apparatuses, and non-transitory computer-readable medium described herein may further include operations, features, means, or instructions for receiving, in the UE capability signaling, one or more parameter values that indicate an identified beam switching capability for each subcarrier spacing of the set of subcarrier spacings.

In some examples of the method, apparatuses, and non-transitory computer-readable medium described herein, the transmission time interval may be a 1 millisecond subframe transmission time interval.

In some examples of the method, apparatuses, and non-transitory computer-readable medium described herein, the one or more parameter values indicate the quantity of reception beam switches, the quantity of transmission beam switches, or both.

A method of wireless communications at a base station is described. The method may include identifying a subcarrier spacing of a set of subcarrier spacings for communications between the base station and a UE, receiving, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both, and communicating with the UE based on the indicated beam switching capability.

An apparatus for wireless communications at a base station is described. The apparatus may include a processor, memory coupled with the processor, and instructions stored in the memory. The instructions may be executable by the processor to cause the apparatus to identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both, and communicate with the UE based on the indicated beam switching capability.

Another apparatus for wireless communications at a base station is described. The apparatus may include means for identifying a subcarrier spacing of a set of subcarrier spacings for communications between the base station and a UE, receiving, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both, and communicating with the UE based on the indicated beam switching capability.

A non-transitory computer-readable medium storing code for wireless communications at a base station is described. The code may include instructions executable by a processor to identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both, and communicate with the UE based on the indicated beam switching capability.

In some examples of the method, apparatuses, and non-transitory computer-readable medium described herein, receiving the one or more parameter values may include operations, features, means, or instructions for receiving the one or more parameter values using radio resource control signaling.

Some examples of the method, apparatuses, and non-transitory computer-readable medium described herein may further include operations, features, means, or instructions for receiving, in the UE capability signaling, one or more parameter values that indicate an identified beam switching capability for each subcarrier spacing of the set of subcarrier spacings.

In some examples of the method, apparatuses, and non-transitory computer-readable medium described herein, the one or more parameter values indicate the beam switching capability for reception beams, transmission beams, or both.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
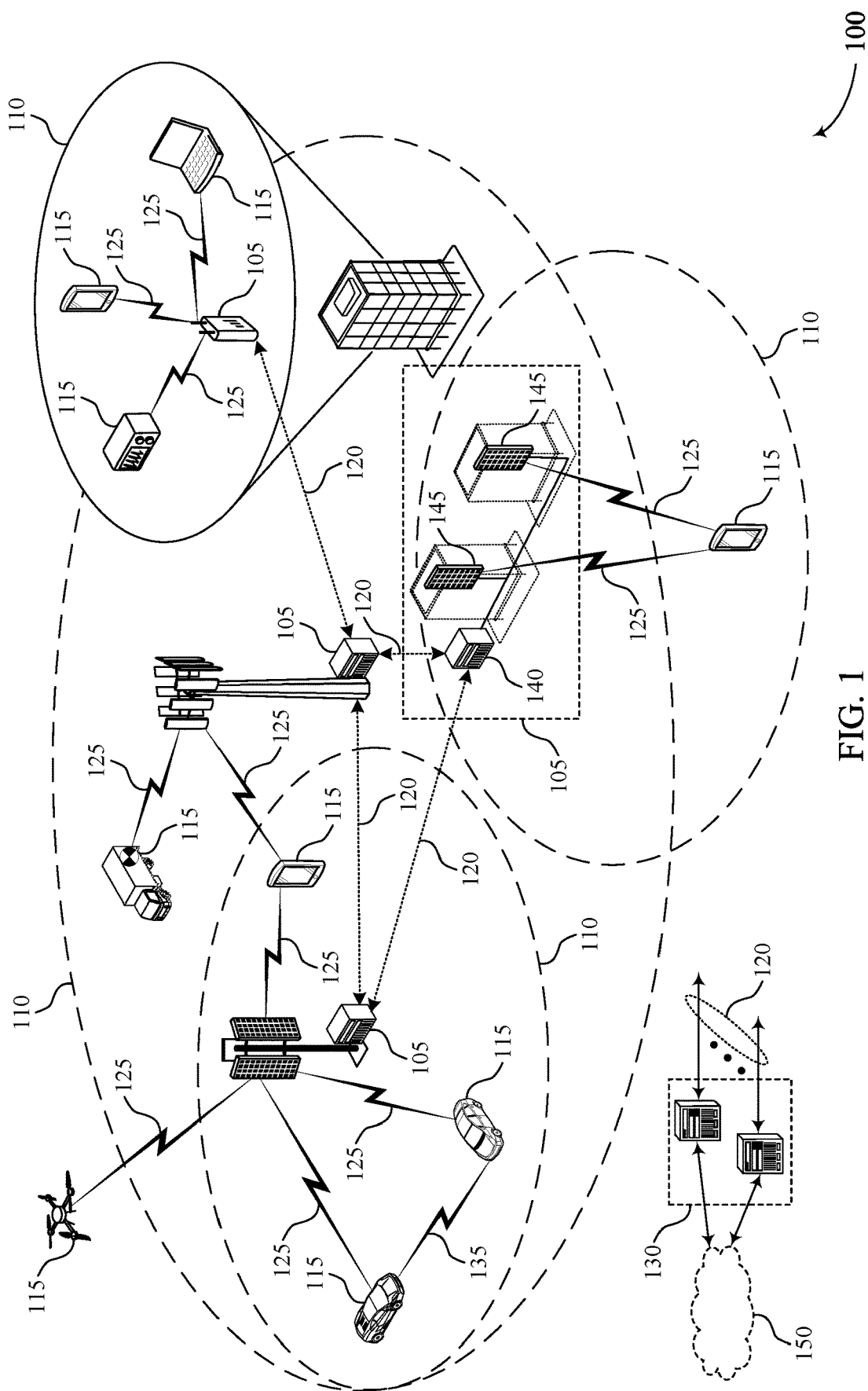
FIG. 1 illustrates an example of a system for wireless communications that supports beam switching capability for systems with high subcarrier spacing in accordance with aspects of the present disclosure.

Devices of a wireless communications system may support beamforming to enhance reliability and efficiency using directional signal transmission. For example, a base station and a user equipment (UE) may communicate using various beam pairs, and the devices may transition between beams during a transmission period. Hardware limitations of UE may increase overhead for beam switching. More particularly, analog beam switching for a UE may include decoding of control information, reprogramming radio frequency software or firmware, retuning radio frequency front ends, etc. These procedures may result in a beam switching delay. Thus, a base station may account for the UE beam switch delay when scheduling resources for communications between the UE and the base station.

These devices may operate in various frequency bands, and a subcarrier spacing that is used for the communications may depend on the operating frequency band. For example, in high band operations (e.g., ~60 GHz carrier frequency or FR4 design) in new radio (NR) systems, the subcarrier spacing may be increased to limit or prevent phase noise. The subcarrier spacing may also inform an orthogonal frequency multiplexing (OFDM) symbol length as well as a cyclic prefix length that is positioned between adjacent symbols in a transmission duration. More particularly, as a subcarrier spacing increases, the OFDM symbol length and the cyclic prefix length may decrease (e.g., the OFDM symbol length and the cyclic prefix length inversely scales with the subcarrier spacing).

In some subcarrier spacings, the cyclic prefix duration may provide a guard period during which a UE may perform a beam switch between symbol periods. However, with higher subcarrier spacings (and lower OFDM symbol and cyclic prefix lengths), the cyclic prefix may not contain the beam switch delay. Accordingly, some additional time gaps may be provided between symbols at higher subcarrier spacings (e.g., 960 kHz). A UE may report a beam switching capability for a subcarrier spacing such that the base station may provide these time gaps when scheduling UE communications. The beam switching capability reported by the UE may indicate the number of beam switches that a UE can perform in one slot for the particular subcarrier spacing. According to some implementations, the capabilities that the UE may report are limited to 4, 7, and 14 beam switches per slot. However, these values may be too stringent for higher subcarrier spacings. For example, a 960 kHz subcarrier spacing includes a 15.6 µs slot length, and a UE may not be able to perform a full beam switch in the slot. Thus, the reporting values may be inadequate.

The techniques described herein provide an enhanced beam switch reporting capability. In one example, a UE may report a maximum number of beam switches (N) that the UE may conduct per a number of slots (M). The indicated number of beam switches (N) may be the number transmission (Tx) beam changes, or reception (Rx) beam changes, or both, and the number of slots may be greater than one. The UE may use these parameters to report the values of N and M. In some examples, the values may be implicitly determined with reference to a reference subcarrier spacing or a reference time duration. The reporting techniques described herein may provide enhanced ability to report beam switching capabilities for higher subcarrier spacings.

Particular aspects of the subject matter described herein may be implemented to realize one or more advantages. The described techniques may support improvements in the beamforming communication framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system illustrating capability reporting and a process flow diagram. Aspects of the disclosure are further illustrated by and described with reference to apparatus diagrams, system diagrams, and flowcharts that relate to beam switching capability for systems with high subcarrier spacing.

FIG. 1 illustrates an example of a wireless communications system 100 that supports beam switching capability for systems with high subcarrier spacing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support UE capability reporting. In some examples, the UE 115 may transmit a report indicating beam switching capability to a base station 105. The capability may indicate a quantity of beam switches that the UE 115 is able to perform for a plurality of spots corresponding to a subcarrier spacing of a set of subcarrier spacings for communications between the UE 115 and the base station 105. The quantity of beam switches and a number of the plurality of slots may be explicitly or implicitly reported relative to a reference subcarrier spacing or reference time duration. In some examples, the UE 115 may report a threshold quantity of symbol periods between beam switching operations associated with the subcarrier spacing, or a beam switching time for the subcarrier spacing, or both. The base station 105 may schedule communications with the UE 115 in accordance with the reported capability.

Figure 2:
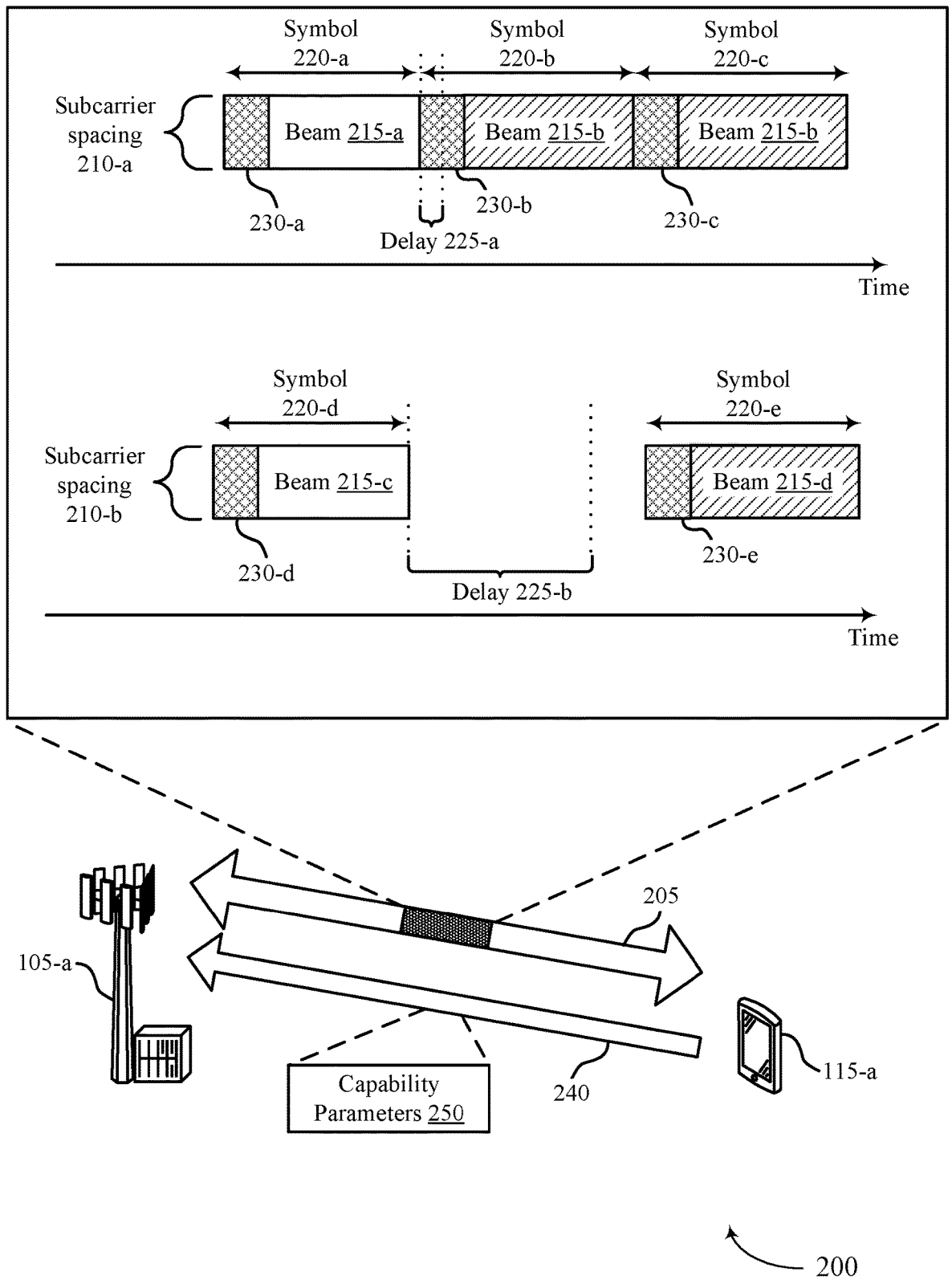
FIG. 2 illustrates an example of a wireless communications system that supports beam switching capability for systems with high subcarrier spacing in accordance with aspects of the present disclosure.

FIG. 2 illustrates an example of a wireless communications system 200 that supports beam switching capability for systems with high subcarrier spacing in accordance with aspects of the present disclosure. In some examples, wireless communications system 200 may implement aspects of wireless communication system 100. For example, the wireless communications system 200 may include a UE 115-a and a base station 105-a, which may be examples of the corresponding devices described with reference to FIG. 1. Generally, the wireless communications system 200 may illustrate an example of communications 205 between the UE 115-a and the base station 105-a.

The devices of the wireless communications system 200 may support beamforming to enhance reliability and efficiency using directional signal transmission. In some examples, the base station 105-a may indicate one or more downlink beams 215 (e.g., via transmission configuration indicator (TCI) states configured with quasi-co-location (QCL) Type D properties in NR). For example, the base station 105 a may indicate a TCI state via downlink control information (DCI), physical downlink control channel (PDCCH), or medium access control layer control element (MAC-CE) messaging, or a combination thereof. In some examples, the UE 115-a may identify one or more QCL properties based on the default QCL assumptions, for example, if a scheduled offset between a scheduling PDCCH and a scheduled physical downlink shared channel (PDSCH) transmission fails to satisfy a threshold (e.g., the scheduling offset may be less than a threshold time duration). In such examples, the UE 115-a may identify QCL properties for the demodulation reference signal (DMRS) ports of PDSCH communications. As an illustrative example, the QCL properties for the DMRS ports of the PDSCH communications may be the same as the QCL properties used for a CORESET of a lowest identification or identifier (ID) monitored in the latest slot (e.g., a default TCI assumption). In some other examples, the scheduling offset may satisfy (e.g., be greater than or equal to) the threshold and the UE 115-a may determine that the DMRS ports of the PDSCH are QCL with the reference signals (RSs) in the indicated TCI states. In some examples, the threshold value may vary (e.g., different threshold values may be used for cross-carrier scheduling).

The UE 115-a and the base station 105-a may perform communications 205 using various beam pairs, and the devices may transition between beams 215 during a transmission period (e.g., transition between beam 215-a and beam 215-b at the beginning of the delay 225-a). Hardware limitations of the UE 115-a may increase overhead associated with such beam switching. For example, the analog beam switching for the UE 115-a may include decoding of control information, reprogramming radio frequency software or firmware, retuning radio frequency front ends, etc. These procedures may result in a beam switching delay 225. Thus, the base station 105-a may account for the beam switching delay 225 when scheduling resources for the communications 205 between the UE 115-a and the base station 105-a. In some examples, the length of a beam switching delay 225 may be based on one or more factors. For example, if one or more parameters are pre-configured (e.g., the beam switching procedures may include a radio frequency front end delay, but may not include decoding control information and reprogramming radio frequency software or firmware), the delay 225 may be relatively short in duration.

In some examples, the delay 225 may be included in a duration of a cyclic prefix 230 (e.g., in NR FR2 with 120 kHz subcarrier spacing, among other examples). For example, in the subcarrier spacing 210-a, the delay 225-a associated with switching from the beam 215-a to the beam 215-b may be included in the cyclic prefix 230-b. In such examples, the devices in the wireless communications system may refrain from implementing an additional switching gap (e.g., a longer time period allocated for switching beams, such as a guard time illustrated by the delay 225-b).

In some examples, the devices in the wireless communications system 200 may operate in various frequency bands and a subcarrier spacing 210 that is used for the communications may depend on the operating frequency band. For example, in high band operations (e.g., ~60 GHz carrier frequency or FR4 design) in NR systems, a subcarrier spacing 210 may be increased to limit or prevent phase noise. As illustrative examples, a relatively higher subcarrier spacing 210-b may be 960 kHz, 1.92 MHz, 3.84 MHz, etc., although any subcarrier spacing 210 may be used. The subcarrier spacing 210 may also inform a length of a symbol 220 (e.g., an OFDM symbol) as well as a length of a cyclic prefix 230 that is positioned between adjacent symbols 220 in a transmission duration. For example, as a subcarrier spacing 210 increases (e.g., to the relatively higher subcarrier spacing 210-b), the length of a symbol 220 and the length of a cyclic prefix 230 may decrease (e.g., the length of the symbol 220-d and the symbol 220-e, the length of the cyclic prefix 230-d and the cyclic prefix 230-e, or both may inversely scale with the subcarrier spacing 210-b).

As illustrated in the subcarrier spacing 210-a, the duration of a cyclic prefix 230 may provide a guard period in which the UE 115-a may perform a beam switch between symbols 220-a and 220-b. However, as illustrated in the relatively higher subcarrier spacing 210-b, in some examples, the cyclic prefix 230-e may not contain the beam switching delay 225-b. Accordingly, some additional time gaps may be provided between symbols 220-d and 220-e (e.g., an integer quantity of symbols 220 may be inserted between the symbol 220-d and the symbol 220-e in order to satisfy a time threshold for performing a beam switch from the beam 215-c to the beam 215-d). In some examples, the UE 115-a may report a beam switching capability for a subcarrier spacing 210 such that the base station 105-a may provide such time gaps when scheduling the UE 115-a with communication resources. The beam switching capability reported by the UE 115-a may indicate the number of beam switches that the UE 115-a can perform in one slot for a particular subcarrier spacing 210. For some subcarrier spacings, the UE 115-a may not be able to perform a full beam switch in a slot. For example, with hardware supporting 4 or 7 beam switches for slot with a 120 kHz subcarrier spacing, the same hardware may support ½ or ⅞ beam switches per slot in a 960 kHz subcarrier spacing. According to some implementations, the capabilities that the UE may report are limited to 4, 7, and 14 beam switches per slot. However, these values may be too stringent for higher subcarrier spacings, as described in the above examples. Accordingly, smaller candidate values, such as 1 or 2 switches per a number of slots may be supported by the implementations described herein. Further, aside from hardware limitations, switching beams may not be power efficient and may cause out of band emission issues.

The techniques described herein provide for enhanced capability reporting. The UE 115-a may transmit one or more capability parameters 250 using UE capability signaling 240. The one or more capability parameters 250 may indicate a quantity of beam switches (N) for a plurality of slots (M) of a transmission time interval for one or more subcarrier spacings. In some examples, the capability parameters 250 may explicitly indicate the values of N and M as a pair of values (M, N). For example, UE 115-a may report any of the values {(1, 4), (1, 7), (1, 14)} as a capability. If the UE 115-a reports (1, 4), the UE may perform four beam switches in one slot. These values may be examples for a 120 kHz subcarrier spacing, but these values may be reported for other subcarrier spacings as well. Further, the values {(1, 4), (1, 7), (1, 14)} for a 120 kHz may translate to {(8, 4), (8, 7), (8, 14)} for a 960 kHz subcarrier spacing with the same hardware capability. It should be understood that other values for M and N are contemplated for various subcarrier spacings. UE 115-a may report the capability pair (M, N) for each subcarrier spacing supported by the UE. In some cases, the capability signaling may use RRC signaling and may be reported for transmission beams, reception beams, or both transmission and reception beams.

In some cases, instead of explicitly reporting the values for M and N, these values may be implied based on a reference subcarrier spacing. A reference subcarrier spacing may be determined as a part of the beam switching capability (e.g., jointly reported), or defined/configured as a separate parameter of the one or more capability parameters 250. The reference subcarrier spacing may separate for each subcarrier spacing or common for each subcarrier spacing supported by the UE 115-a. As an example, if 120 kHz is used as the reference subcarrier spacing, and the reported value for the number of beam switches (N) is one of {4, 7, 14} for 960 kHz subcarrier spacing, then the reported values is translated as "per 8-slots" (M). This translation may be based on 1 slot in the reference subcarrier spacing amounting to 8 slots in the reported subcarrier spacing. Thus, the UE 115-a may report a value N, without explicitly reporting M. Rather, M may be derived based on the reference subcarrier spacing, which may be a default value (e.g., configured at the UE 115-a) or may be reported in the capability parameters 250. It should be understood that various combinations of reference subcarrier spacings and reported beam switch quantities may be used.

Further, instead of using a reference subcarrier spacing for indicating the capability, the UE 115-a may use a reference time duration. A reference time duration may be determined as a part of the beam switching capability (e.g., jointly reported), or defined/configured as a separate parameter of the one or more capability parameters 250. The reference time duration may separate for each subcarrier spacing or common for each subcarrier spacing supported by the UE 115-a. As an example, if 0.125 millisecond is used as the reference time duration, and the reported value for the number of beam switches (N) is one of {4, 7, 14} for 960 kHz subcarrier spacing, then the reported values is translated as "per 8-slots" (M). This translation may be based on 0.125 millisecond amounts to 8 slots in the reported subcarrier spacing. Thus, the UE 115-a may report a value N, without explicitly reporting M. Rather, M may be derived based on the reference time duration, which may be a default value (e.g., configured at the UE 115-a) or may be reported in the capability parameters 250. It should be understood that various combinations of reference time durations and reported beam switch quantities may be used. The reference time duration or reference subcarrier spacing techniques may be used to report the capability for transmission beams, reception beams, or both transmission and reception beams.

Further, to account for the shorter slot/transmission durations in higher subcarrier spacing configurations, the UE 115-a may report a minimum beam dwell time or beam switching delay as the capability parameters 250. The minimum beam dwell time may correspond to a minimum time duration (e.g., a threshold number of symbols) that the UE 115-a should or will stay with a beam after a beam switch and before the next beam switch. The beam switch delay may correspond to a time duration that the UE 115-a uses or needs to complete a beam switching operations. For example, if the reported value of the minimum beam dwell time or beam switching delay is K symbols for a subcarrier spacing, the UE 115-a may not expect to perform another beam switching within K symbols after the previous beam switching. Additionally, if the minimum beam dwell time or beam switching delay report is used jointly with other enhanced beam switching capability parameters, such as M and N, the parameters may need to be consistent. For example, for the reported values of M, N, and K, it may be required to satisfy $K \cdot N \leq N_{slot} \cdot M$, where $N_{slot}$ is the total number of symbols per slot. These capabilities may be reported for transmission beams, reception beams, or both transmission and reception beams, and such capabilities may be reported for each subcarrier spacing supported by the UE 115-a. The minimum beam dwell time and beam switching delay capabilities may be defined as a part of the beam switching capability entity (jointly reported), or defined as a separate UE capability (reported separately).

Based on the capability parameters 250, such as explicit (M, N) pair, N with a reference subcarrier spacing or a reference time duration, and/or minimum beam dwell time or beam switching delay, that are transmitted to the base station 105-a using the UE capability signaling 240, the base station 105-a may schedule the communications 205. The communications may be scheduled such that the UE 115-a has enough time to perform a beam switch between each slot or number of slots. More particularly, the base station 105-a may schedule the communications 205 with one or more time gaps to account for the reported capabilities. These various parameters may be reported using explicit values, using indexes corresponding to lookup tables, or the like.

Figure 3:
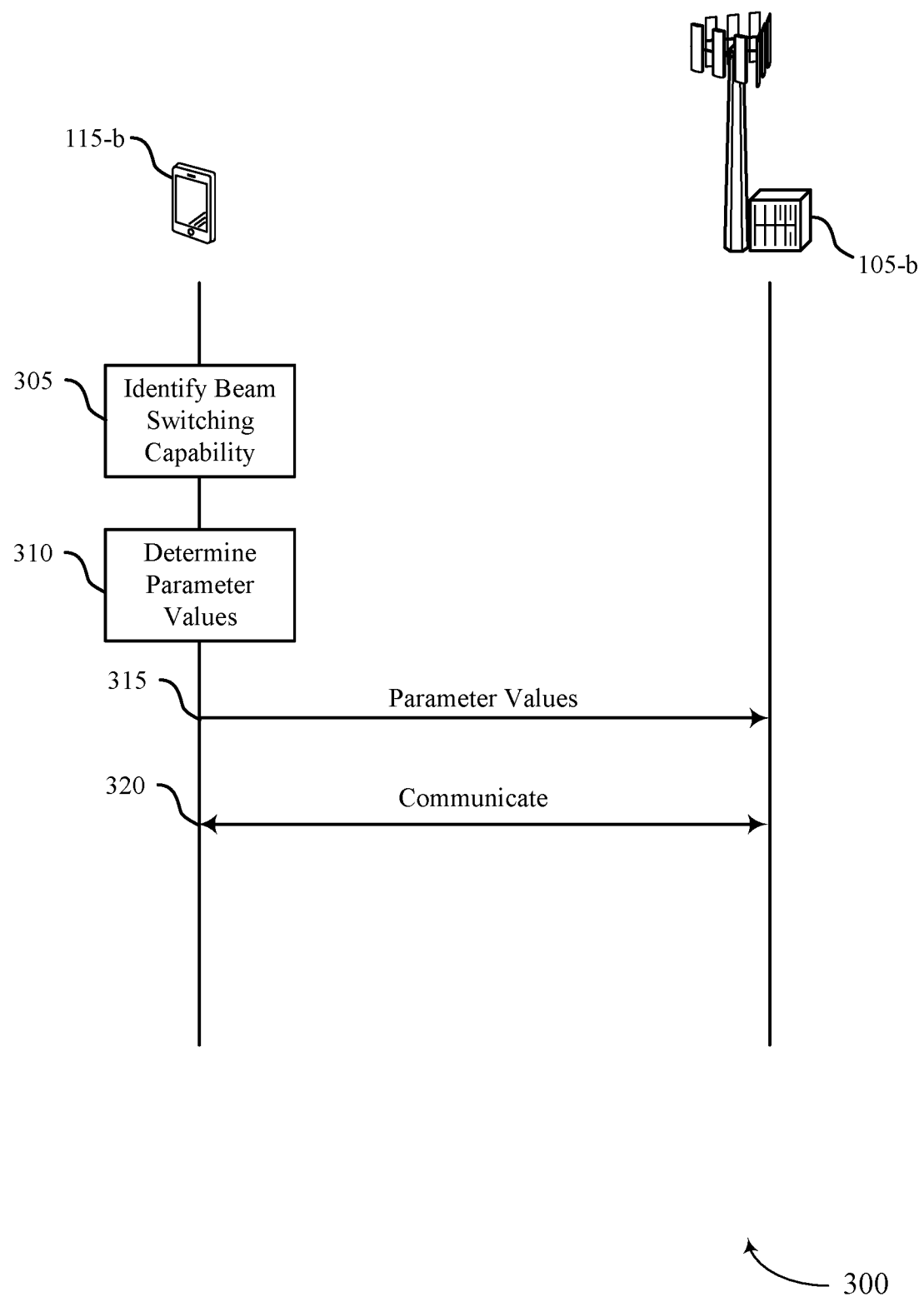
FIG. 3 illustrates an example of a process flow diagram that supports beam switching capability for systems with high subcarrier spacing in accordance with aspects of the present disclosure.

FIG. 3 illustrates an example of a process flow diagram 300 that supports beam switching capability for systems with high subcarrier spacing in accordance with aspects of the present disclosure. In some examples, process flow diagram 300 may implement aspects of wireless communication system 100. The process flow diagram 300 includes a base station 105-b and a UE 115-b, which may be examples of the corresponding devices of FIGS. 1 and 2.

At 305, the UE 115-a may identify a beam switching capability for a subcarrier spacing of a set of subcarrier spacings for communications between the UE and a base station. In some examples, the beam switching capability may indicate a quantity of beam switches for a plurality of slots of a transmission time interval. In some examples, the beam switching capability may indicate a threshold quantity of symbol periods between beam switching operations associated with the subcarrier spacing, or a beam switching time for the subcarrier spacing, or both. The capability may be based on the hardware configuration of the UE 115-b.

At 310, the UE 115-b may determine, for the identified beam switching capability, one or more parameter values that indicate the identified beam switching capability. In one example, the UE 115-a may determine a value (e.g., N) indicating the quantity of beam switches that the UE 115-a is able to perform per a second value (e.g., M) indicating the number of slots. In another example, the UE 115-a may determine a quantity of beam switches relative to a reference subcarrier spacing or relative to a reference time duration. Thus, a value N may be determined relative to the reference subcarrier spacing or reference time duration. In other examples, the UE 115-a may determine a value indicating a threshold quantity of symbol periods between beam switching operations associated with the subcarrier spacing, or a beam switching time for the subcarrier spacing, or both.

At 315, the UE 115-b may transmit in UE capability signaling, the determined one or more parameter values to the base station 105-b. The UE capability signaling may be RRC signaling (e.g., RRC signaling including a UE capability report). As noted above, the UE 115-a may transmit a pair of values (M, N), a value N relative to a reference subcarrier spacing or time duration, or threshold quantity of symbol periods between beam switching operations associated with the subcarrier spacing, or a beam switching time for the subcarrier spacing. In some cases, the reference subcarrier spacing or the reference time duration is reported using the one or more parameters. The parameters may be reported for each subcarrier spacing and for transmission beams, reception beams, or both transmission and reception beams.

At 320, the UE 115-b communicates with the base station according to the identified beam switching capability. The base station 105-b may schedule the communications based on the received capability parameters.

Figure 4:
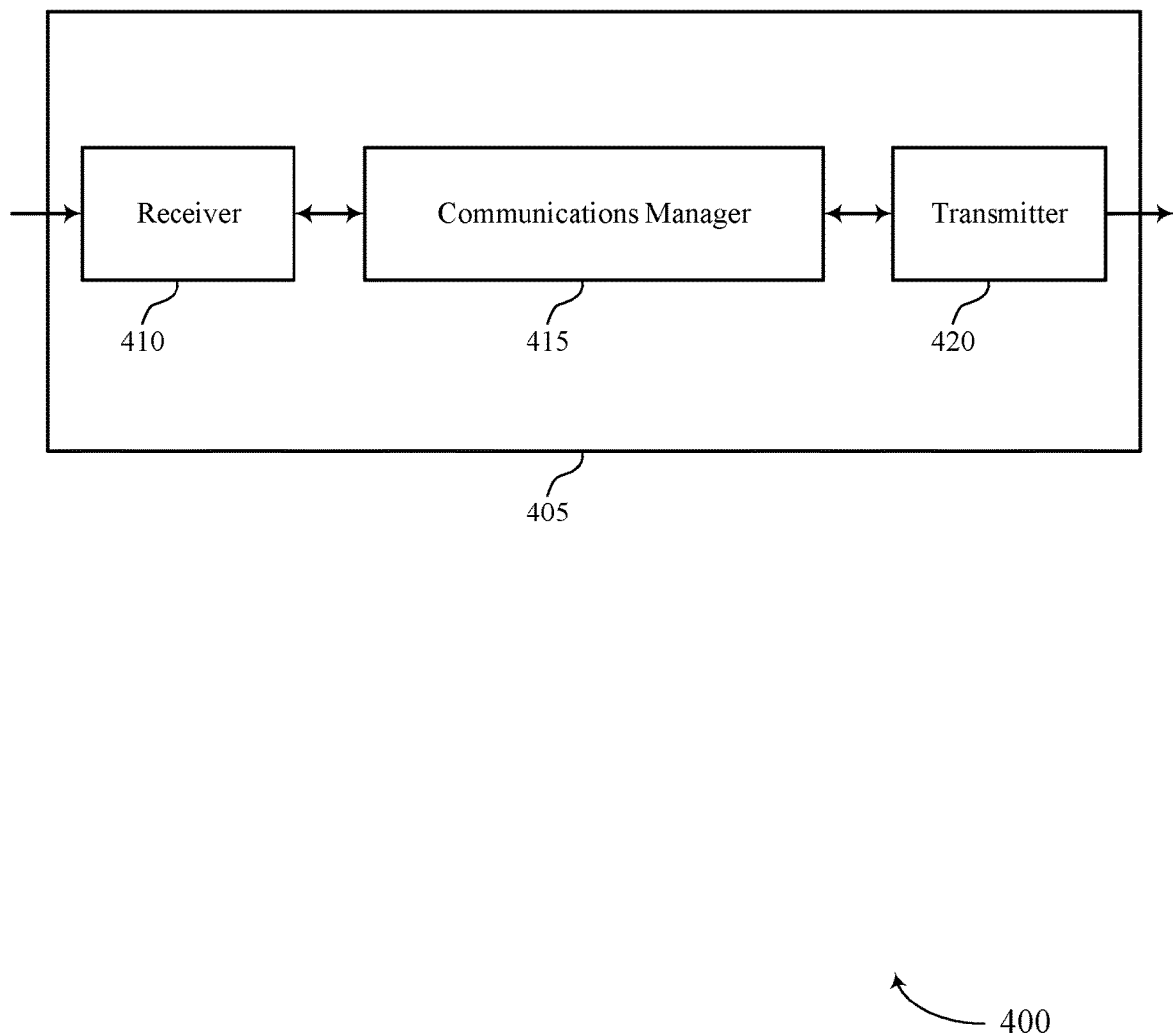
FIGS. 4 and 5 show block diagrams of devices that support beam switching capability for systems with high subcarrier spacing in accordance with aspects of the present disclosure.

FIG. 4 shows a block diagram 400 of a device 405 that supports beam switching capability for systems with high subcarrier spacing in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to beam switching capability for systems with high subcarrier spacing, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a beam switching capability for a subcarrier spacing of a set of subcarrier spacings for communications between the UE and a base station, the beam switching capability indicating a quantity of beam switches for a set of slots of a transmission time interval, determine, for the identified beam switching capability, one or more parameter values that indicate the identified beam switching capability, transmit, in UE capability signaling, the determined one or more parameter values to the base station, and communicate with the base station according to the identified beam switching capability. The communications manager 415 may also identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both, determine, for the identified beam switching capability, one or more parameter values that indicate the identified beam switching capability, transmit an indication of the determined one or more parameter values to the base station, and communicate with the base station according to the identified beam switching capability. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to more efficiently determine and communicate beam switching capabilities. For example, the device 405 may identify a capability, report the capability, and communicate with the base station according to the reported capability.

Based on implementing the capability reporting techniques as described herein, a processor of a UE 115 (e.g., controlling the receiver 410, the transmitter 420, or the transceiver 720 as described with reference to FIG. 7) may increase reliability and decrease signaling overhead based on the reporting of capabilities. That is, since the UE 115 may have enhanced capability reporting, the UE may be able to communicate with the base station in accordance with the capability.

Figure 5:
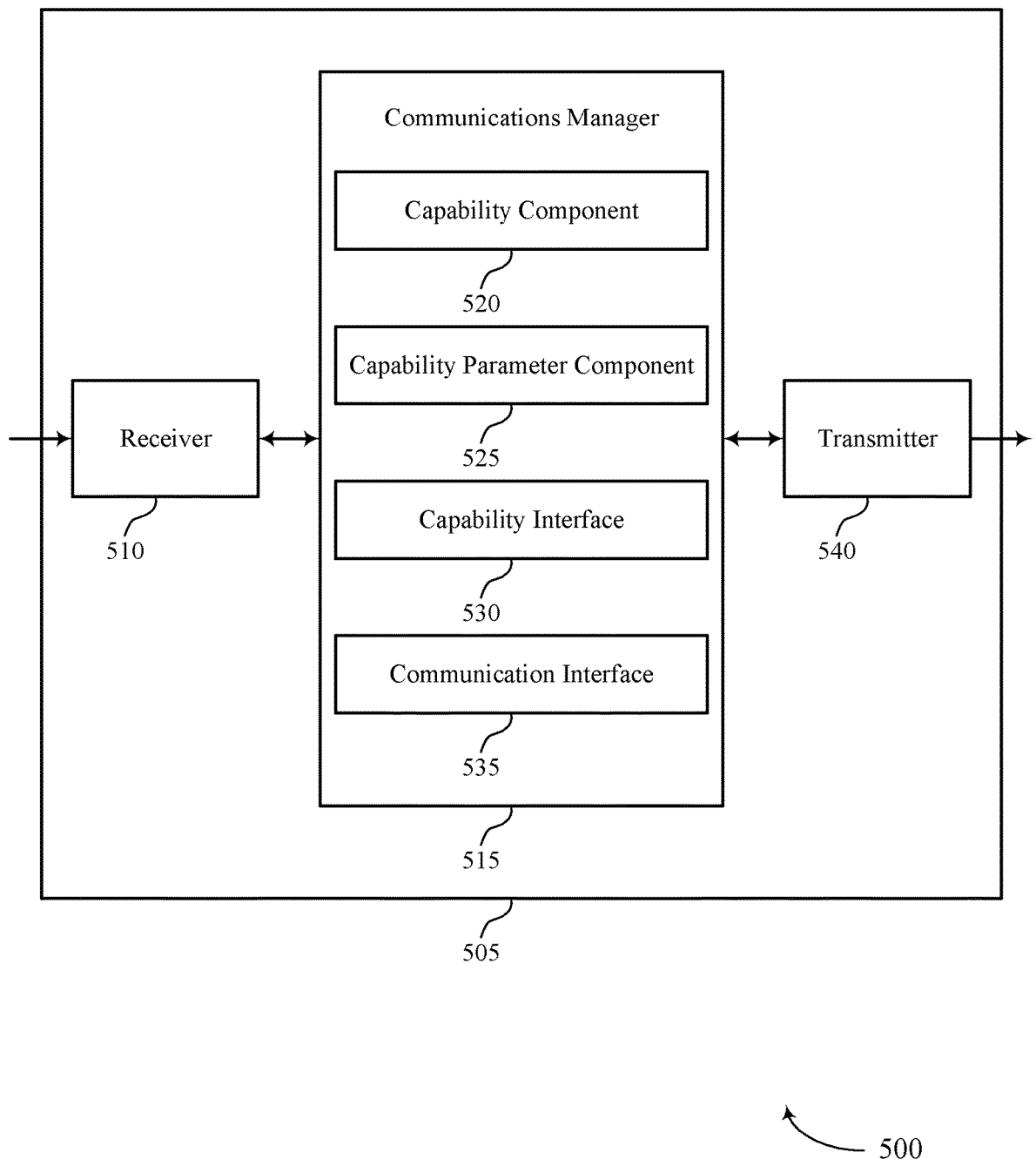

FIG. 5 shows a block diagram 500 of a device 505 that supports beam switching capability for systems with high subcarrier spacing in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to beam switching capability for systems with high subcarrier spacing, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a capability component 520, a capability parameter component 525, a capability interface 530, and a communication interface 535. The communications manager 515 may be an example of aspects of the communications manager 710 described herein.

The capability component 520 may identify a beam switching capability for a subcarrier spacing of a set of subcarrier spacings for communications between the UE and a base station, the beam switching capability indicating a quantity of beam switches for a set of slots of a transmission time interval.

The capability parameter component 525 may determine, for the identified beam switching capability, one or more parameter values that indicate the identified beam switching capability.

The capability interface 530 may transmit, in UE capability signaling, the determined one or more parameter values to the base station. The communication interface 535 may communicate with the base station according to the identified beam switching capability.

The capability component 520 may identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both.

The capability parameter component 525 may determine, for the identified beam switching capability, one or more parameter values that indicate the identified beam switching capability.

The capability interface 530 may transmit an indication of the determined one or more parameter values to the base station. The communication interface 535 may communicate with the base station according to the identified beam switching capability.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
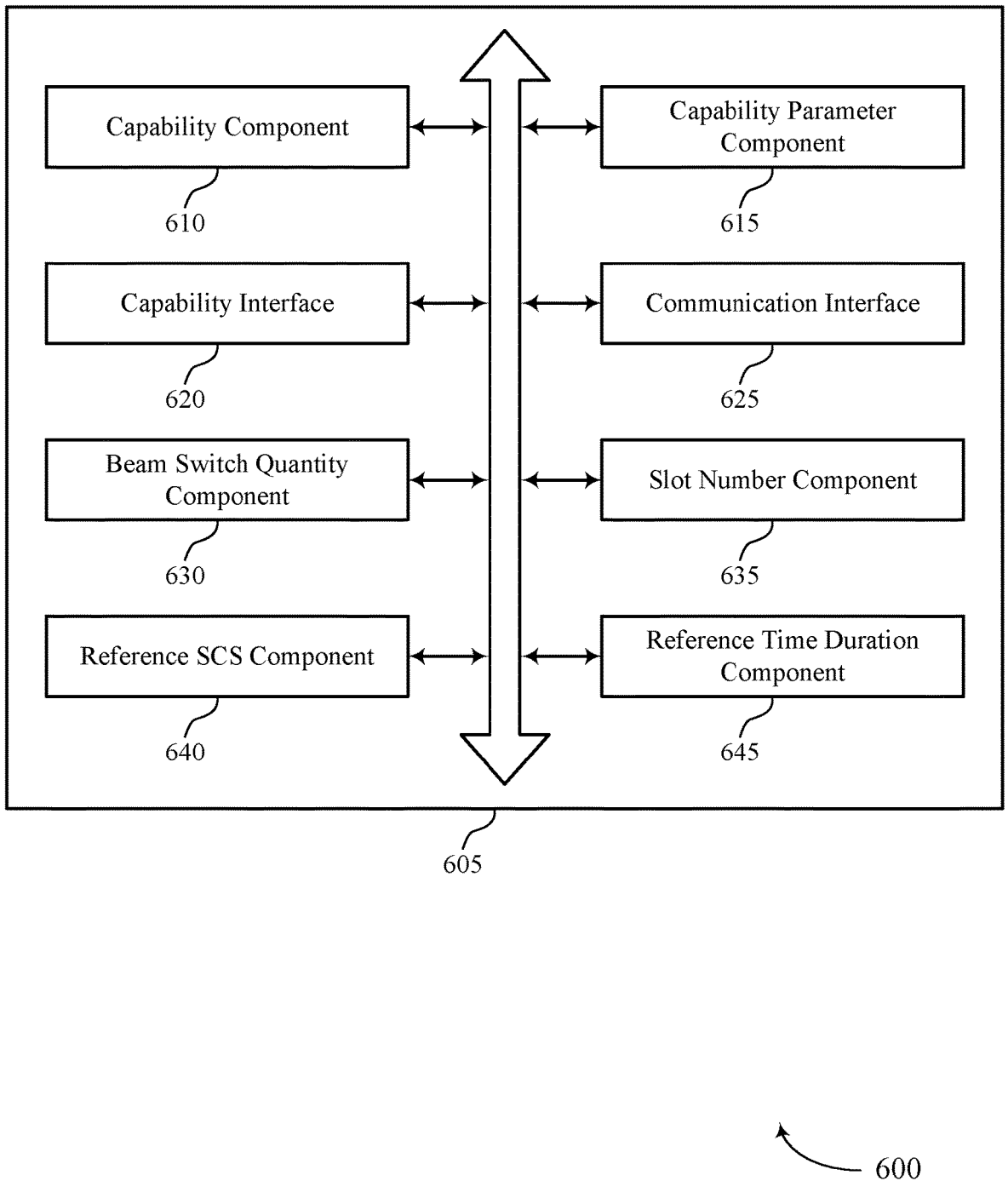
FIG. 6 shows a block diagram of a communications manager that supports beam switching capability for systems with high subcarrier spacing in accordance with aspects of the present disclosure.

FIG. 6 shows a block diagram 600 of a communications manager 605 that supports beam switching capability for systems with high subcarrier spacing in accordance with aspects of the present disclosure. The communications manager 605 may be an example of aspects of a communications manager 415, a communications manager 515, or a communications manager 710 described herein. The communications manager 605 may include a capability component 610, a capability parameter component 615, a capability interface 620, a communication interface 625, a beam switch quantity component 630, a slot number component 635, a reference subcarrier spacing (SCS) component 640, and a reference time duration component 645. Each of these modules may communicate, directly or indirectly, with one another (e.g., via one or more buses).

The capability component 610 may identify a beam switching capability for a subcarrier spacing of a set of subcarrier spacings for communications between the UE and a base station, the beam switching capability indicating a quantity of beam switches for a set of slots of a transmission time interval.

In some examples, the capability component 610 may identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both.

In some cases, the transmission time interval is a 1 millisecond subframe transmission time interval. The capability parameter component 615 may determine, for the identified beam switching capability, one or more parameter values that indicate the identified beam switching capability.

In some examples, the capability parameter component 615 may determine, for the identified beam switching capability, one or more parameter values that indicate the identified beam switching capability. The capability interface 620 may transmit, in UE capability signaling, the determined one or more parameter values to the base station.

In some examples, the capability interface 620 may transmit an indication of the determined one or more parameter values to the base station. In some examples, the capability interface 620 may transmit the determined one or more parameter values using radio resource control signaling.

In some examples, the capability interface 620 may transmit, in the UE capability signaling, one or more parameter values that indicate an identified beam switching capability for each subcarrier spacing of the set of subcarrier spacings. In some examples, the capability interface 620 may transmit the determined one or more parameter values using radio resource control signaling.

In some examples, the capability interface 620 may transmit, in the UE capability signaling, one or more parameter values that indicate an identified beam switching capability for each subcarrier spacing of the set of subcarrier spacings. In some cases, the one or more parameter values indicate the quantity of reception beam switches, the quantity of transmission beam switches, or both.

In some cases, the one or more parameter values indicate the beam switching capability for reception beams, transmission beams, or both. The communication interface 625 may communicate with the base station according to the identified beam switching capability.

In some examples, the communication interface 625 may communicate with the base station according to the identified beam switching capability. The beam switch quantity component 630 may determine a value for a first parameter indicating the quantity of beam switches.

The slot number component 635 may determine a value for a second parameter indicating a number of slots of the set of slots, where the value for the first parameter and the value of the second parameter are transmitted to the base station.

The reference SCS component 640 may identify the quantity of beam switches for the set of slots based on a reference subcarrier spacing, where the one or more parameter values indicate the quantity of beam switches for the set of slots based on the reference subcarrier spacing.

In some cases, the reference subcarrier spacing is indicated by the one or more parameter values. In some cases, the reference subcarrier spacing is a default reference subcarrier spacing. In some cases, the reference subcarrier spacing is a 120 kHz subcarrier spacing.

The reference time duration component 645 may identify the quantity of beam switches for the set of slots based on a reference time duration, where the one or more parameter values indicate the quantity of beam switches for the set of slots based on the reference time duration.

In some cases, the reference time duration is indicated by the one or more parameter values. In some cases, the reference time duration is a default reference time duration. In some cases, the reference time duration is a 0.125 millisecond time duration.

Figure 7:
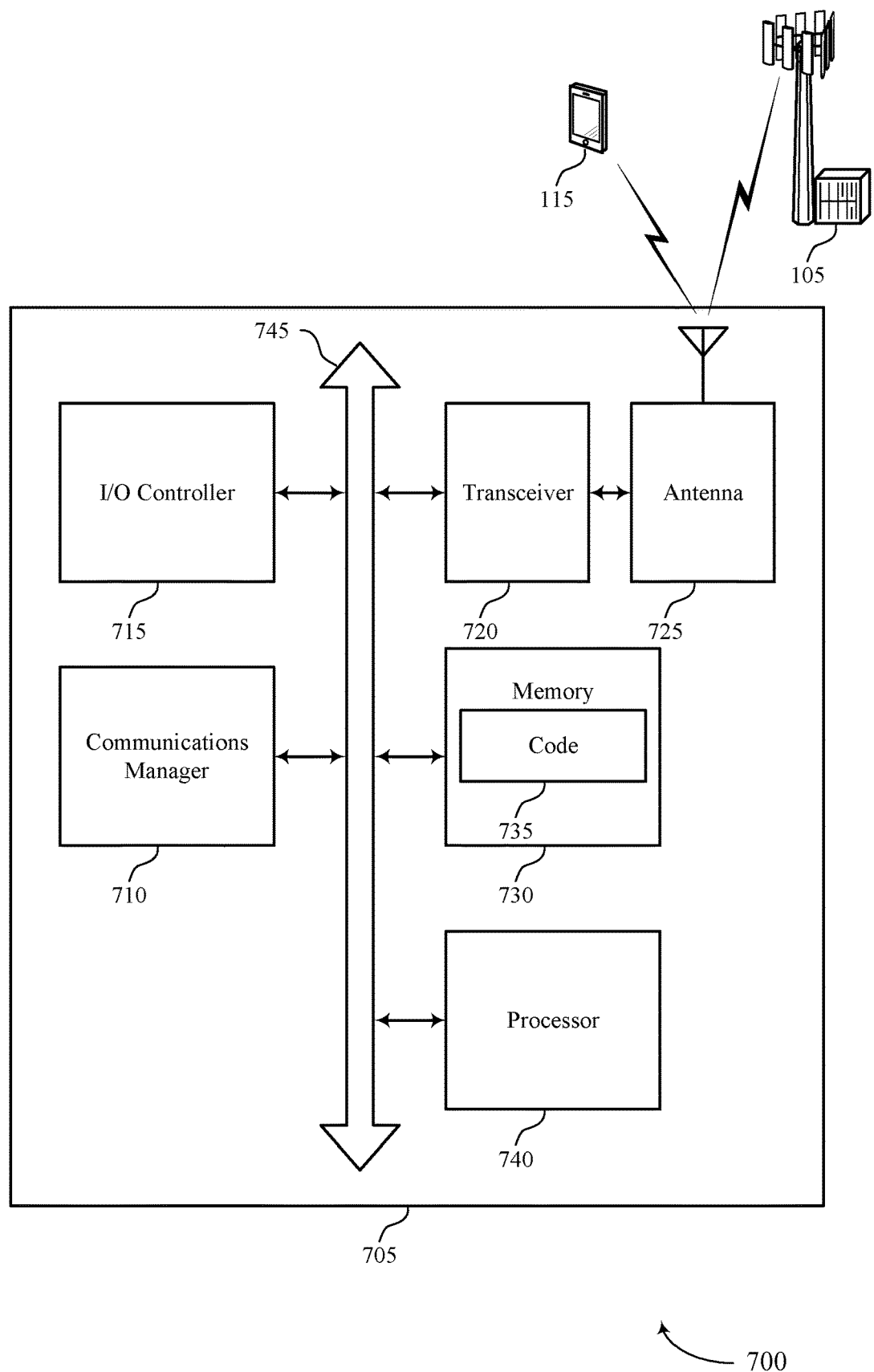
FIG. 7 shows a diagram of a system including a device that supports beam switching capability for systems with high subcarrier spacing in accordance with aspects of the present disclosure.

FIG. 7 shows a diagram of a system 700 including a device 705 that supports beam switching capability for systems with high subcarrier spacing in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a beam switching capability for a subcarrier spacing of a set of subcarrier spacings for communications between the UE and a base station, the beam switching capability indicating a quantity of beam switches for a set of slots of a transmission time interval, determine, for the identified beam switching capability, one or more parameter values that indicate the identified beam switching capability, transmit, in UE capability signaling, the determined one or more parameter values to the base station, and communicate with the base station according to the identified beam switching capability. The communications manager 710 may also identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both, determine, for the identified beam switching capability, one or more parameter values that indicate the identified beam switching capability, transmit an indication of the determined one or more parameter values to the base station, and communicate with the base station according to the identified beam switching capability.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting beam switching capability for systems with high subcarrier spacing).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
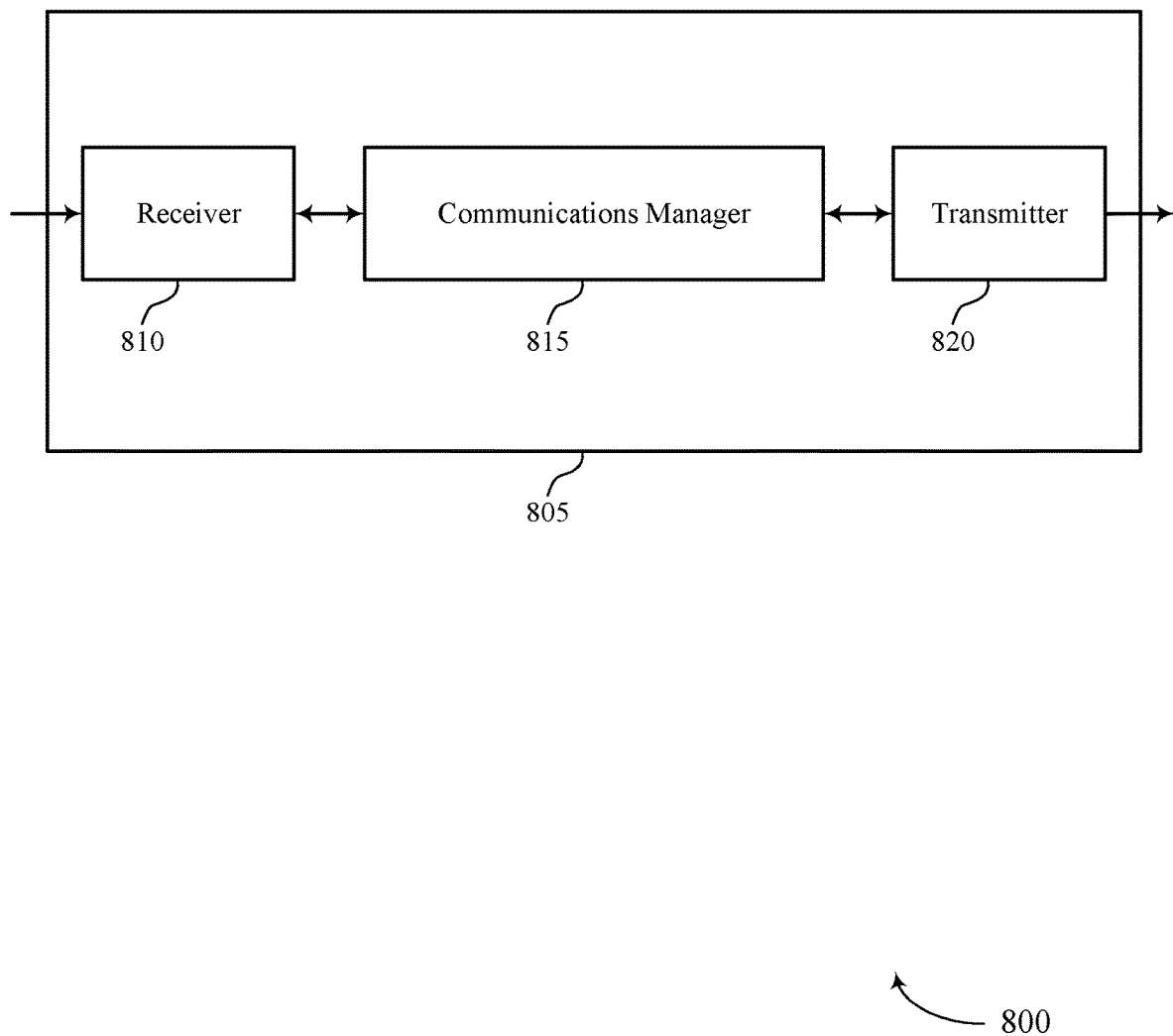
FIGS. 8 and 9 show block diagrams of devices that support beam switching capability for systems with high subcarrier spacing in accordance with aspects of the present disclosure.

FIG. 8 shows a block diagram 800 of a device 805 that supports beam switching capability for systems with high subcarrier spacing in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam switching capability for systems with high subcarrier spacing, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a quantity of beam switches for a set of slots, and communicate with the UE based on the indicated beam switching capability. The communications manager 815 may also identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both, and communicate with the UE based on the indicated beam switching capability. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
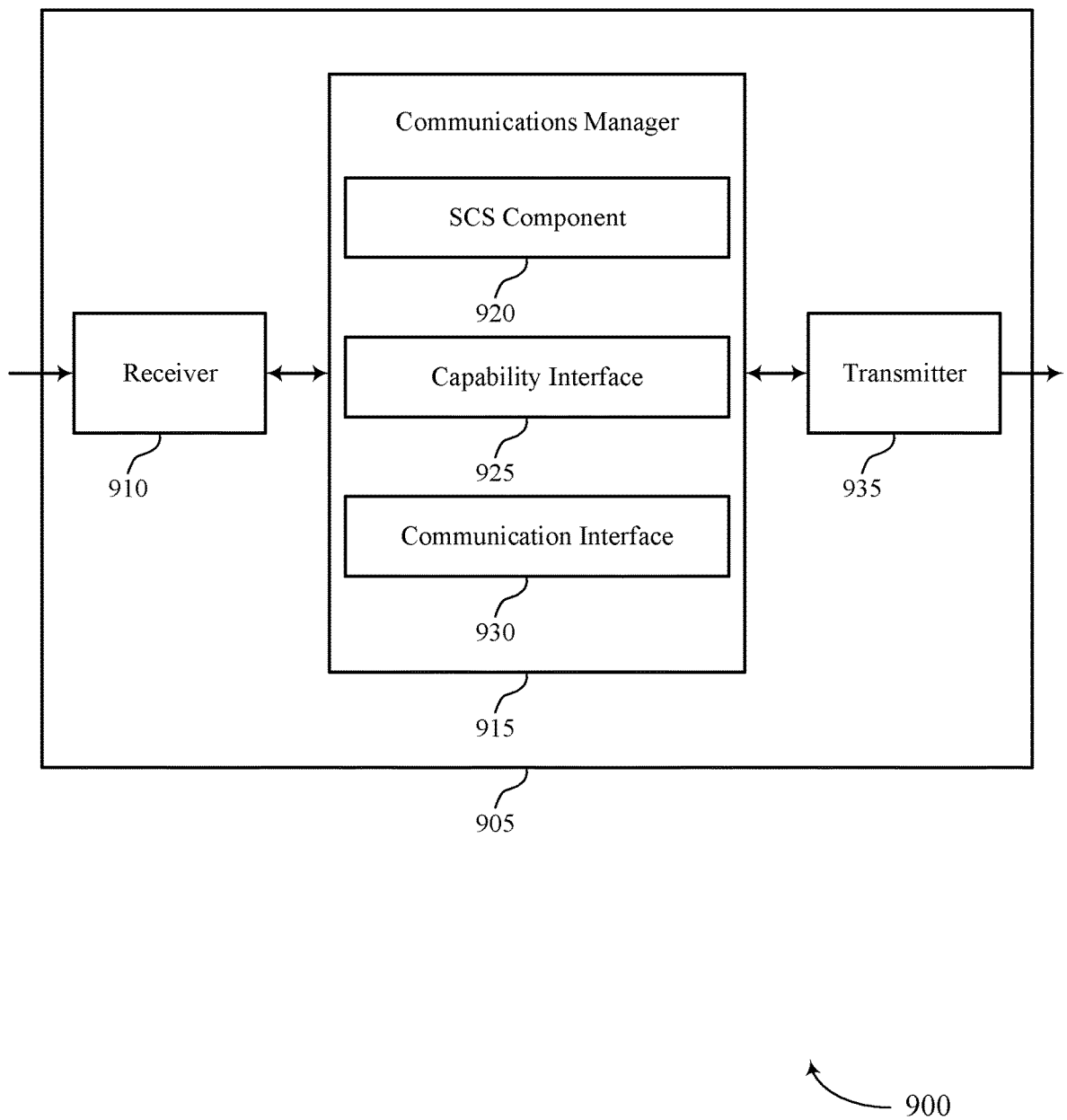

FIG. 9 shows a block diagram 900 of a device 905 that supports beam switching capability for systems with high subcarrier spacing in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to beam switching capability for systems with high subcarrier spacing, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a SCS component 920, a capability interface 925, and a communication interface 930. The communications manager 915 may be an example of aspects of the communications manager 1110 described herein.

The SCS component 920 may identify a subcarrier spacing of a set of subcarrier spacings for communications between the base station and a UE. The capability interface 925 may receive, from the UE, one or more parameter values that indicate a beam switching capability of the UE corresponding to the subcarrier spacing, the beam switching capability indicating a quantity of beam switches for a set of slots. The communication interface 930 may communicate with the UE based on the indicated beam switching capability. The SCS component 920 may identify a subcarrier spacing of a set of subcarrier spacings for communications between the base station and a UE.

The capability interface 925 may receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both. The communication interface 930 may communicate with the UE based on the indicated beam switching capability.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
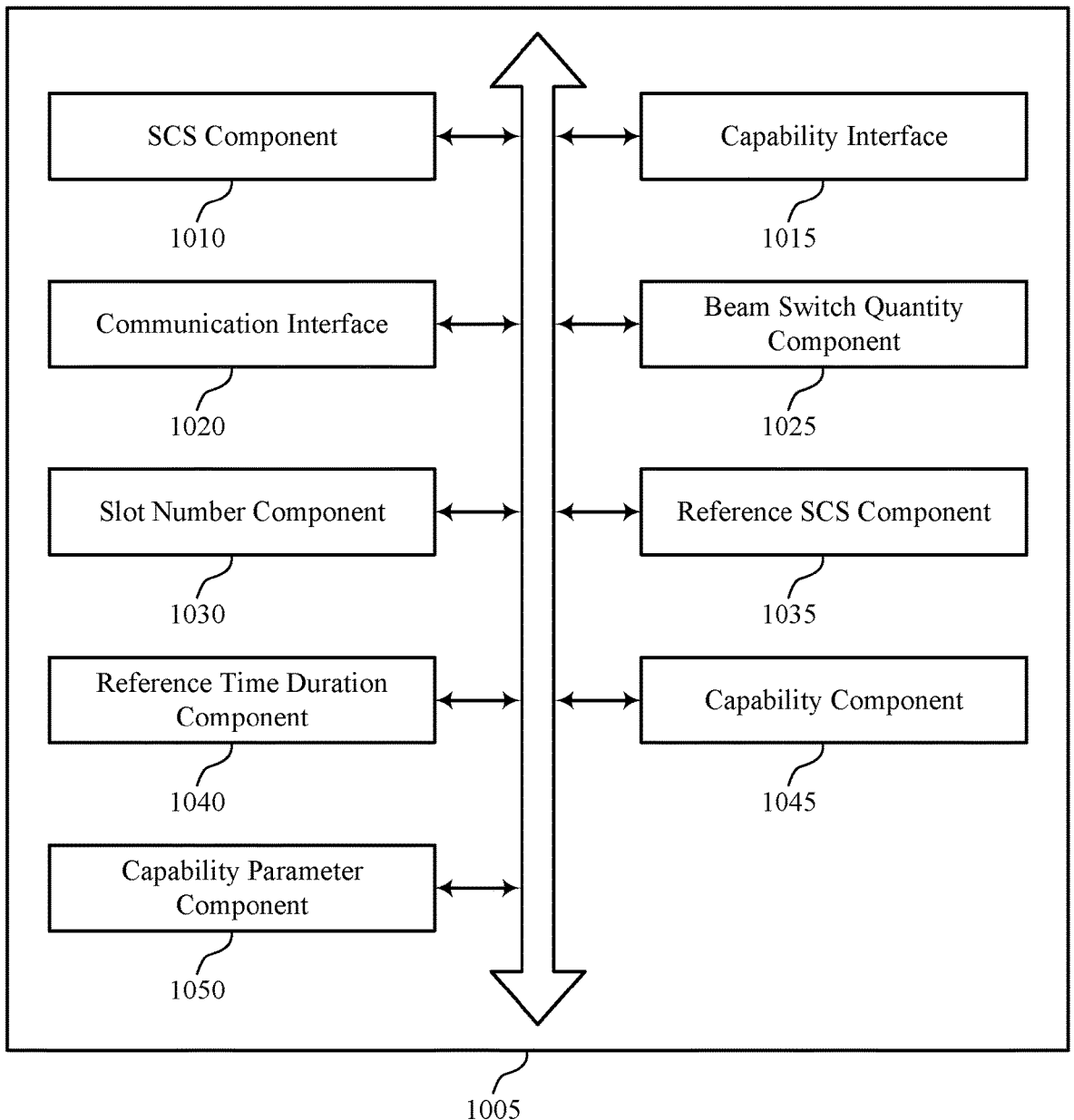
FIG. 10 shows a block diagram of a communications manager that supports beam switching capability for systems with high subcarrier spacing in accordance with aspects of the present disclosure.

FIG. 10 shows a block diagram 1000 of a communications manager 1005 that supports beam switching capability for systems with high subcarrier spacing in accordance with aspects of the present disclosure. The communications manager 1005 may be an example of aspects of a communications manager 815, a communications manager 915, or a communications manager 1110 described herein. The communications manager 1005 may include a SCS component 1010, a capability interface 1015, a communication interface 1020, a beam switch quantity component 1025, a slot number component 1030, a reference SCS component 1035, a reference time duration component 1040, a capability component 1045, and a capability parameter component 1050. Each of these modules may communicate, directly or indirectly, with one another (e.g., via one or more buses).

The SCS component 1010 may identify a subcarrier spacing of a set of subcarrier spacings for communications between the base station and a UE. In some examples, the SCS component 1010 may identify a subcarrier spacing of a set of subcarrier spacings for communications between the base station and a UE.

The capability interface 1015 may receive, from the UE, one or more parameter values that indicate a beam switching capability of the UE corresponding to the subcarrier spacing, the beam switching capability indicating a quantity of beam switches for a set of slots.

In some examples, the capability interface 1015 may receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both. In some examples, the capability interface 1015 may receive the one or more parameter values using radio resource control signaling.

In some examples, the capability interface 1015 may receive, in the UE capability signaling, one or more parameter values that indicate an identified beam switching capability for each subcarrier spacing of the set of subcarrier spacings. In some examples, the capability interface 1015 may receive the one or more parameter values using radio resource control signaling.

In some examples, the capability interface 1015 may receive, in the UE capability signaling, one or more parameter values that indicate an identified beam switching capability for each subcarrier spacing of the set of subcarrier spacings.

The communication interface 1020 may communicate with the UE based on the indicated beam switching capability.

In some examples, the communication interface 1020 may communicate with the UE based on the indicated beam switching capability.

The beam switch quantity component 1025 may receive a first value for a first parameter indicating the quantity of beam switches.

The slot number component 1030 may receive a value for a second parameter indicating a number of slots of the set of slots, where the value for the first parameter and the value of the second parameter are transmitted to the base station.

The reference SCS component 1035 may identify the quantity of beam switches for the set of slots based on a reference subcarrier spacing, where the one or more parameter values indicate the quantity of beam switches for the set of slots based on the reference subcarrier spacing. In some cases, the reference subcarrier spacing is indicated by the one or more parameter values. In some cases, the reference subcarrier spacing is a default reference subcarrier spacing. In some cases, the reference subcarrier spacing is a 120 kHz subcarrier spacing.

The reference time duration component 1040 may identify the quantity of beam switches for the set of slots based on a reference time duration, where the one or more parameter values indicate the quantity of beam switches for the set of slots based on the reference time duration.

In some cases, the reference time duration is indicated by the one or more parameter values. In some cases, the reference time duration is a default reference time duration. In some cases, the reference time duration is a 0.125 millisecond time duration.

The capability component 1045 may receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both. In some cases, the transmission time interval is a 1 millisecond subframe transmission time interval.

The capability parameter component 1050 may identify that the one or more parameter values indicate the quantity of reception beam switches, the quantity of transmission beam switches, or both In some cases, the one or more parameter values indicate the quantity of reception beam switches, the quantity of transmission beam switches, or both. In some cases, the one or more parameter values indicate the beam switching capability for reception beams, transmission beams, or both.

Figure 11:
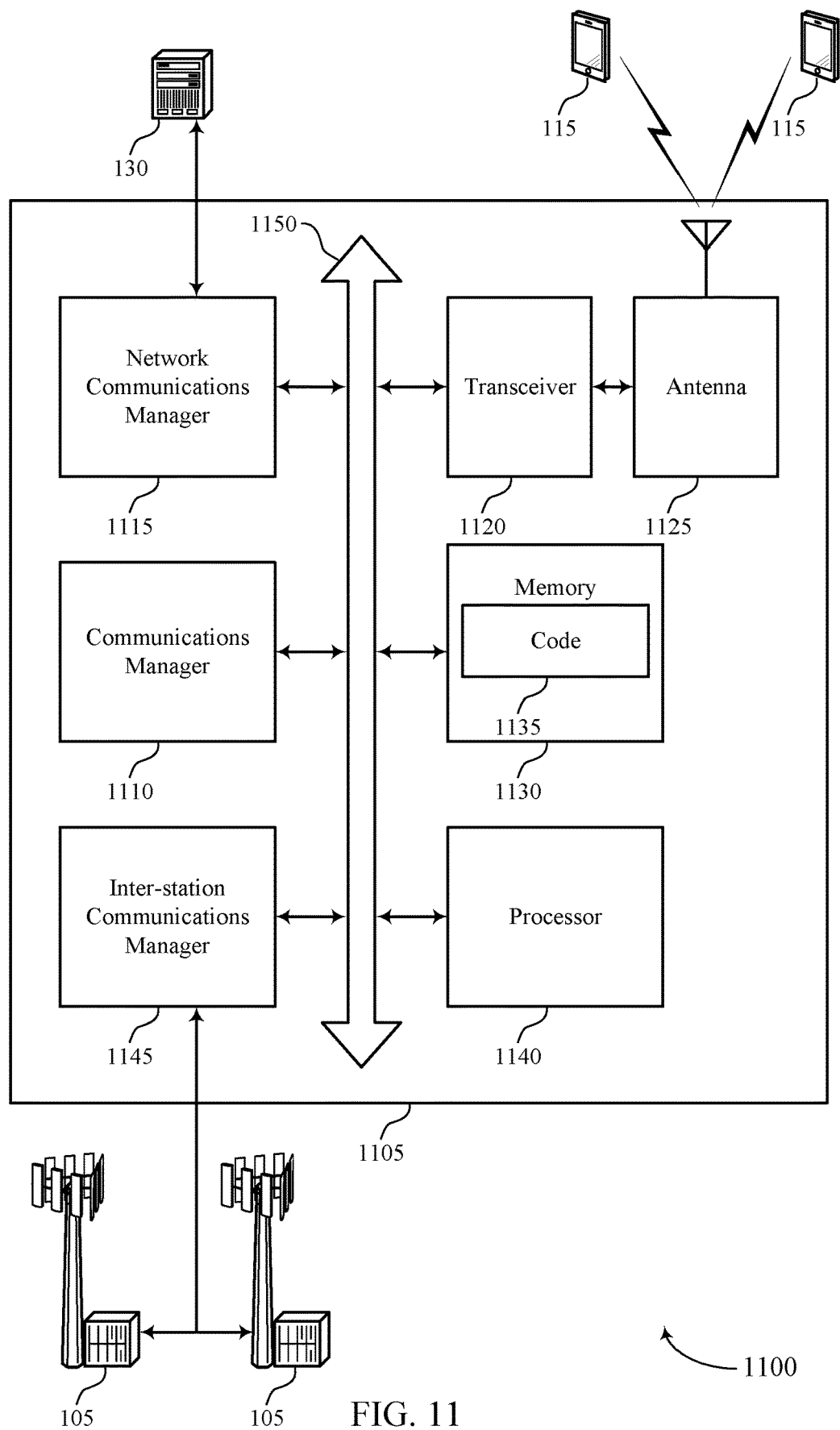
FIG. 11 shows a diagram of a system including a device that supports beam switching capability for systems with high subcarrier spacing in accordance with aspects of the present disclosure.

FIG. 11 shows a diagram of a system 1100 including a device 1105 that supports beam switching capability for systems with high subcarrier spacing in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a quantity of beam switches for a set of slots, and communicate with the UE based on the indicated beam switching capability. The communications manager 1110 may also identify a subcarrier spacing of a set of subcarrier spacings for communications between the base station and a UE, receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both, and communicate with the UE based on the indicated beam switching capability.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting beam switching capability for systems with high subcarrier spacing).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
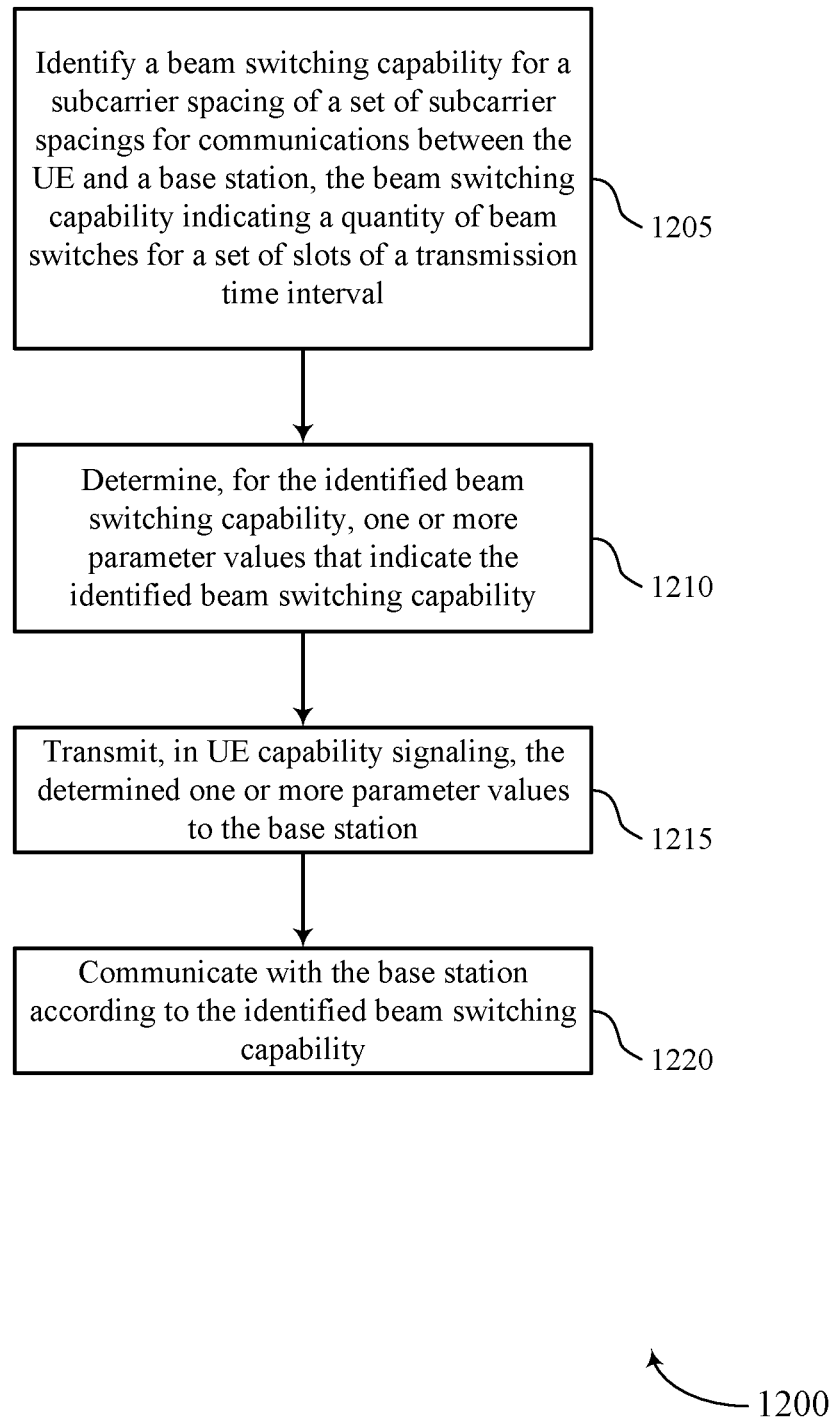
FIGS. 12 through 15 show flowcharts illustrating methods that support beam switching capability for systems with high subcarrier spacing in accordance with aspects of the present disclosure.

FIG. 12 shows a flowchart illustrating a method 1200 that supports beam switching capability for systems with high subcarrier spacing in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a beam switching capability for a subcarrier spacing of a set of subcarrier spacings for communications between the UE and a base station, the beam switching capability indicating a quantity of beam switches for a set of slots of a transmission time interval. The operations of 1205 may be performed according to the methods described herein. In some examples, aspects of the operations of 1205 may be performed by a capability component as described with reference to FIGS. 4 through 7.

At 1210, the UE may determine, for the identified beam switching capability, one or more parameter values that indicate the identified beam switching capability. The operations of 1210 may be performed according to the methods described herein. In some examples, aspects of the operations of 1210 may be performed by a capability parameter component as described with reference to FIGS. 4 through 7.

At 1215, the UE may transmit, in UE capability signaling, the determined one or more parameter values to the base station. The operations of 1215 may be performed according to the methods described herein. In some examples, aspects of the operations of 1215 may be performed by a capability interface as described with reference to FIGS. 4 through 7.

At 1220, the UE may communicate with the base station according to the identified beam switching capability. The operations of 1220 may be performed according to the methods described herein. In some examples, aspects of the operations of 1220 may be performed by a communication interface as described with reference to FIGS. 4 through 7.

Figure 13:
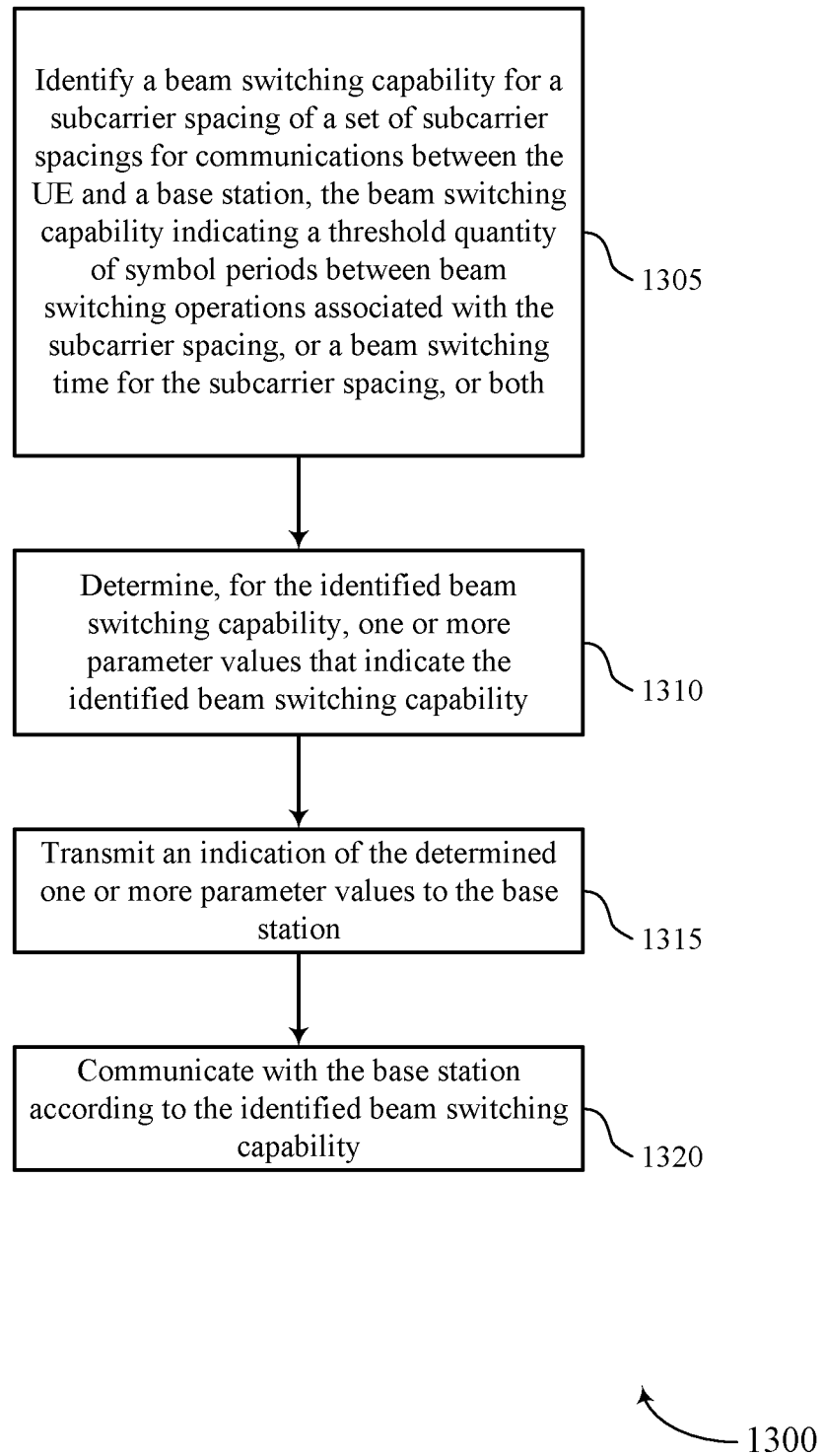

FIG. 13 shows a flowchart illustrating a method 1300 that supports beam switching capability for systems with high subcarrier spacing in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may identify a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both. The operations of 1305 may be performed according to the methods described herein. In some examples, aspects of the operations of 1305 may be performed by a capability component as described with reference to FIGS. 4 through 7.

At 1310, the UE may determine, for the identified beam switching capability, one or more parameter values that indicate the identified beam switching capability. The operations of 1310 may be performed according to the methods described herein. In some examples, aspects of the operations of 1310 may be performed by a capability parameter component as described with reference to FIGS. 4 through 7.

At 1315, the UE may transmit an indication of the determined one or more parameter values to the base station. The operations of 1315 may be performed according to the methods described herein. In some examples, aspects of the operations of 1315 may be performed by a capability interface as described with reference to FIGS. 4 through 7.

At 1320, the UE may communicate with the base station according to the identified beam switching capability. The operations of 1320 may be performed according to the methods described herein. In some examples, aspects of the operations of 1320 may be performed by a communication interface as described with reference to FIGS. 4 through 7.

Figure 14:
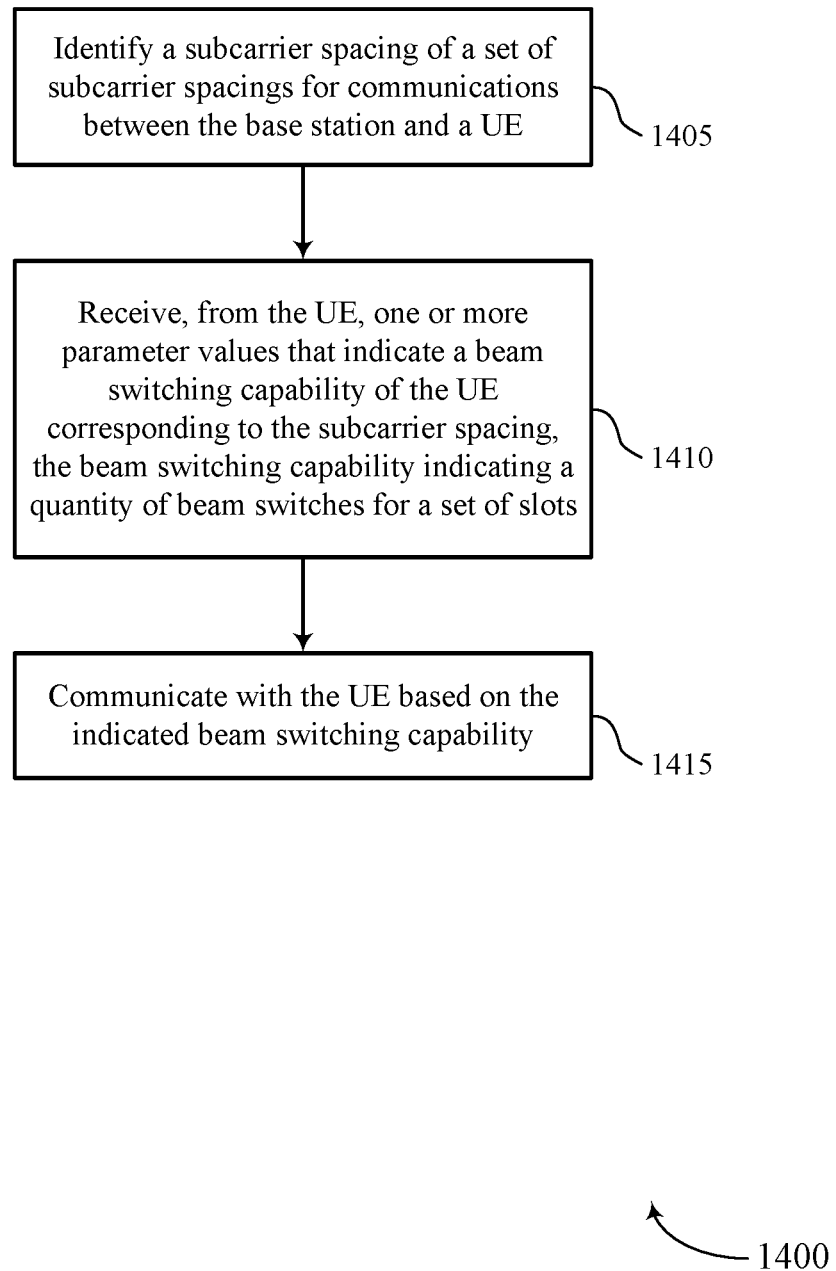

FIG. 14 shows a flowchart illustrating a method 1400 that supports beam switching capability for systems with high subcarrier spacing in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may identify a subcarrier spacing of a set of subcarrier spacings for communications between the base station and a UE. The operations of 1405 may be performed according to the methods described herein. In some examples, aspects of the operations of 1405 may be performed by a SCS component as described with reference to FIGS. 8 through 11.

At 1410, the base station may receive, from the UE, one or more parameter values that indicate a beam switching capability of the UE corresponding to the subcarrier spacing, the beam switching capability indicating a quantity of beam switches for a set of slots. The operations of 1410 may be performed according to the methods described herein. In some examples, aspects of the operations of 1410 may be performed by a capability interface as described with reference to FIGS. 8 through 11.

At 1415, the base station may communicate with the UE based on the indicated beam switching capability. The operations of 1415 may be performed according to the methods described herein. In some examples, aspects of the operations of 1415 may be performed by a communication interface as described with reference to FIGS. 8 through 11.

Figure 15:
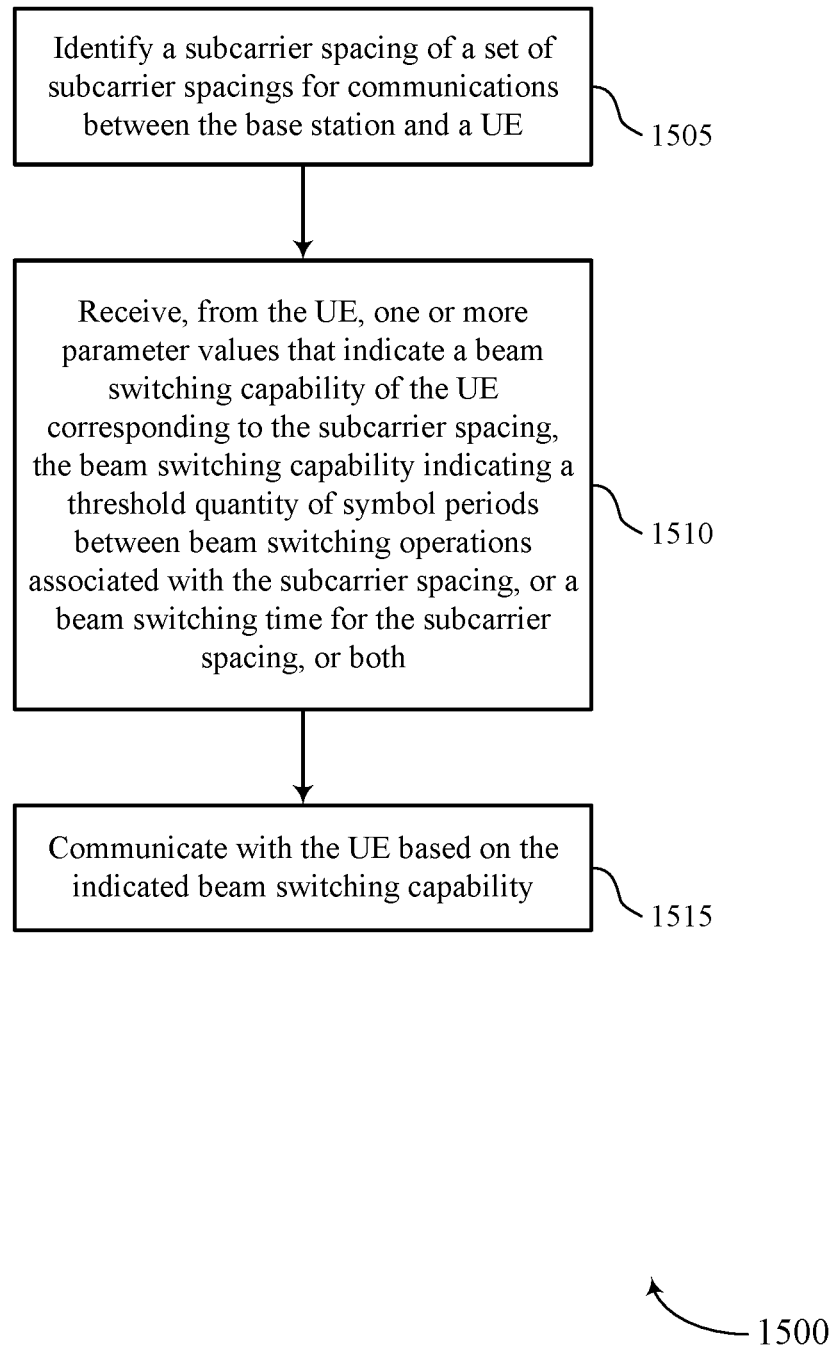

FIG. 15 shows a flowchart illustrating a method 1500 that supports beam switching capability for systems with high subcarrier spacing in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may identify a subcarrier spacing of a set of subcarrier spacings for communications between the base station and a UE. The operations of 1505 may be performed according to the methods described herein. In some examples, aspects of the operations of 1505 may be performed by a SCS component as described with reference to FIGS. 8 through 11.

At 1510, the base station may receive, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both. The operations of 1510 may be performed according to the methods described herein. In some examples, aspects of the operations of 1510 may be performed by a capability interface as described with reference to FIGS. 8 through 11.

At 1515, the base station may communicate with the UE based on the indicated beam switching capability. The operations of 1515 may be performed according to the methods described herein. In some examples, aspects of the operations of 1515 may be performed by a communication interface as described with reference to FIGS. 8 through 11.

The following provides an overview of aspects of the present disclosure:

Aspect 1: A method for wireless communications at a UE, comprising: identifying a beam switching capability for a subcarrier spacing of a set of subcarrier spacings for communications between the UE and a base station, the beam switching capability indicating a quantity of beam switches for a plurality of slots of a transmission time interval; determining, for the identified beam switching capability, one or more parameter values that indicate the identified beam switching capability; transmitting, in UE capability signaling, the determined one or more parameter values to the base station; and communicating with the base station according to the identified beam switching capability.

Aspect 2: The method of aspect 1, wherein determining the one or more parameter values comprises: determining a value for a first parameter indicating the quantity of beam switches; and determining a value for a second parameter indicating a number of slots of the plurality of slots, wherein the value for the first parameter and the value of the second parameter are transmitted to the base station.

Aspect 3: The method of any of aspects 1 through 2, wherein determining the one or more parameter values comprises: identifying the quantity of beam switches for the plurality of slots based at least in part on a reference subcarrier spacing, wherein the one or more parameter values indicate the quantity of beam switches for the plurality of slots based at least in part on the reference subcarrier spacing.

Aspect 4: The method of aspect 3, wherein the reference subcarrier spacing is indicated by the one or more parameter values or the reference subcarrier spacing is a default reference subcarrier spacing.

Aspect 5: The method of any of aspects 1 through 2, wherein determining the one or more parameter values comprises: identifying the quantity of beam switches for the plurality of slots based at least in part on a reference time duration, wherein the one or more parameter values indicate the quantity of beam switches for the plurality of slots based at least in part on the reference time duration.

Aspect 6: The method of aspect 5, wherein the reference time duration is indicated by the one or more parameter values or the reference time duration is a default reference time duration.

Aspect 7: The method of any of aspects 5 through 6, wherein the reference time duration is a 0.125 millisecond time duration.

Aspect 8: The method of any of aspects 1 through 7, wherein transmitting the determined one or more parameter values comprises: transmitting the determined one or more parameter values using radio resource control signaling.

Aspect 9: The method of any of aspects 1 through 8, further comprising: transmitting, in the UE capability signaling, one or more parameter values that indicate an identified beam switching capability for each subcarrier spacing of the set of subcarrier spacings.

Aspect 10: The method of any of aspects 1 through 9, wherein the transmission time interval is a 1 millisecond subframe transmission time interval.

Aspect 11: The method of any of aspects 1 through 10, wherein the one or more parameter values indicate the quantity of reception beam switches, the quantity of transmission beam switches, or both.

Aspect 12: A method for wireless communications at a UE, comprising: identifying a beam switching capability for a subcarrier spacing of a set of subcarrier spacings for communications between the UE and a base station, the beam switching capability indicating a threshold quantity of symbol periods between beam switching operations associated with the subcarrier spacing, or a beam switching time for the subcarrier spacing, or both; determining, for the identified beam switching capability, one or more parameter values that indicate the identified beam switching capability; transmitting an indication of the determined one or more parameter values to the base station; and communicating with the base station according to the identified beam switching capability.

Aspect 13: The method of aspect 12, wherein transmitting the determined one or more parameter values comprises: transmitting the determined one or more parameter values using radio resource control signaling.

Aspect 14: The method of any of aspects 12 through 13, further comprising: transmitting, in the UE capability signaling, one or more parameter values that indicate an identified beam switching capability for each subcarrier spacing of the set of subcarrier spacings.

Aspect 15: The method of any of aspects 12 through 14, wherein the one or more parameter values indicate the beam switching capability for reception beams, transmission beams, or both.

Aspect 16: A method of wireless communications at a base station, comprising: identifying a subcarrier spacing of a set of subcarrier spacings for communications between the base station and a UE; receiving, from the UE, one or more parameter values that indicate a beam switching capability of the UE corresponding to the subcarrier spacing, the beam switching capability indicating a quantity of beam switches for a plurality of slots; and communicating with the UE based at least in part on the indicated beam switching capability.

Aspect 17: The method of aspect 16, wherein receiving the one or more parameter values comprises: receiving a first value for a first parameter indicating the quantity of beam switches; and receiving a value for a second parameter indicating a number of slots of the plurality of slots, wherein the value for the first parameter and the value of the second parameter are transmitted to the base station.

Aspect 18: The method of any of aspects 16 through 17, further comprising: identifying the quantity of beam switches for the plurality of slots based at least in part on a reference subcarrier spacing, wherein the one or more parameter values indicate the quantity of beam switches for the plurality of slots based at least in part on the reference subcarrier spacing.

Aspect 19: The method of aspect 18, wherein the reference subcarrier spacing is indicated by the one or more parameter values or the reference subcarrier spacing is a default reference subcarrier spacing.

Aspect 20: The method of any of aspects 16 through 17, further comprising: identifying the quantity of beam switches for the plurality of slots based at least in part on a reference time duration, wherein the one or more parameter values indicate the quantity of beam switches for the plurality of slots based at least in part on the reference time duration.

Aspect 21: The method of aspect 20, wherein the reference time duration is indicated by the one or more parameter values or the reference time duration is a default reference time duration.

Aspect 22: The method of any of aspects 20 through 21, wherein the reference time duration is a 0.125 millisecond time duration.

Aspect 23: The method of any of aspects 16 through 22, wherein receiving the one or more parameter values comprises: receiving the one or more parameter values using radio resource control signaling.

Aspect 24: The method of any of aspects 16 through 23, further comprising: receiving, in the UE capability signaling, one or more parameter values that indicate an identified beam switching capability for each subcarrier spacing of the set of subcarrier spacings.

Aspect 25: The method of any of aspects 16 through 24, wherein the transmission time interval is a 1 millisecond subframe transmission time interval.

Aspect 26: The method of any of aspects 16 through 25, wherein the one or more parameter values indicate the quantity of reception beam switches, the quantity of transmission beam switches, or both.

Aspect 27: A method of wireless communications at a base station, comprising: identifying a subcarrier spacing of a set of subcarrier spacings for communications between the base station and a UE; receiving, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both; and communicating with the UE based at least in part on the indicated beam switching capability.

Aspect 28: The method of aspect 27, wherein receiving the one or more parameter values comprises: receiving the one or more parameter values using radio resource control signaling.

Aspect 29: The method of any of aspects 27 through 28, further comprising: receiving, in the UE capability signaling, one or more parameter values that indicate an identified beam switching capability for each subcarrier spacing of the set of subcarrier spacings.

Aspect 30: The method of any of aspects 27 through 29, wherein the one or more parameter values indicate the beam switching capability for reception beams, transmission beams, or both.

Aspect 31: An apparatus for wireless communications at a UE, comprising a processor; memory coupled with the processor; and instructions stored in the memory and executable by the processor to cause the apparatus to perform a method of any of aspects 1 through 11.

Aspect 32: An apparatus for wireless communications at a UE, comprising at least one means for performing a method of any of aspects 1 through 11.

Aspect 33: A non-transitory computer-readable medium storing code for wireless communications at a UE, the code comprising instructions executable by a processor to perform a method of any of aspects 1 through 11.

Aspect 34: An apparatus for wireless communications at a UE, comprising a processor; memory coupled with the processor; and instructions stored in the memory and executable by the processor to cause the apparatus to perform a method of any of aspects 12 through 15.

Aspect 35: An apparatus for wireless communications at a UE, comprising at least one means for performing a method of any of aspects 12 through 15.

Aspect 36: A non-transitory computer-readable medium storing code for wireless communications at a UE, the code comprising instructions executable by a processor to perform a method of any of aspects 12 through 15.

Aspect 37: An apparatus comprising a processor; memory coupled with the processor; and instructions stored in the memory and executable by the processor to cause the apparatus to perform a method of any of aspects 16 through 26.

Aspect 38: An apparatus comprising at least one means for performing a method of any of aspects 16 through 26.

Aspect 39: A non-transitory computer-readable medium storing code the code comprising instructions executable by a processor to perform a method of any of aspects 16 through 26.

Aspect 40: An apparatus comprising a processor; memory coupled with the processor; and instructions stored in the memory and executable by the processor to cause the apparatus to perform a method of any of aspects 27 through 30.

Aspect 41: An apparatus comprising at least one means for performing a method of any of aspects 27 through 30.

Aspect 42: A non-transitory computer-readable medium storing code the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a beam switching capability for a subcarrier spacing of a set of subcarrier spacings for communications between the UE and a network entity, the beam switching capability indicating a quantity of beam switches for a plurality of slots of a transmission time interval;
   determining, for the identified beam switching capability, one or more parameter values that indicate the identified beam switching capability, wherein the one or more parameter values comprise a first parameter value indicating the quantity of beam switches and a second parameter value indicating a quantity of slots of the plurality of slots;
   transmitting, in UE capability signaling, the determined one or more parameter values to the network entity; and
   communicating with the network entity according to the identified beam switching capability.

2. The method of claim 1, wherein determining the one or more parameter values comprises:
   identifying the quantity of beam switches for the plurality of slots based at least in part on a reference subcarrier spacing, wherein the one or more parameter values indicate the quantity of beam switches for the plurality of slots based at least in part on the reference subcarrier spacing.

3. The method of claim 2, wherein the reference subcarrier spacing is indicated by the one or more parameter values or the reference subcarrier spacing is a default reference subcarrier spacing.

4. The method of claim 1, wherein determining the one or more parameter values comprises:
   identifying the quantity of beam switches for the plurality of slots based at least in part on a reference time duration, wherein the one or more parameter values indicate the quantity of beam switches for the plurality of slots based at least in part on the reference time duration.

5. The method of claim 4, wherein the reference time duration is indicated by the one or more parameter values or the reference time duration is a default reference time duration.

6. The method of claim 4, wherein the reference time duration is a 0.125 millisecond time duration.

7. The method of claim 1, wherein transmitting the determined one or more parameter values comprises:
transmitting the determined one or more parameter values using radio resource control signaling.

8. The method of claim 1, further comprising:
transmitting, in the UE capability signaling, one or more parameter values that indicate an identified beam switching capability for each subcarrier spacing of the set of subcarrier spacings.

9. The method of claim 1, wherein the transmission time interval is a 1 millisecond subframe transmission time interval.

10. The method of claim 1, wherein the one or more parameter values indicate the quantity of reception beam switches, the quantity of transmission beam switches, or both.

11. A method for wireless communications at a user equipment (UE), comprising:
identifying a beam switching capability for a subcarrier spacing of a set of subcarrier spacings for communications between the UE and a network entity, the beam switching capability indicating a threshold quantity of symbol periods between beam switching operations associated with the subcarrier spacing, or a beam switching time for the subcarrier spacing, or both;
determining, for the identified beam switching capability, one or more parameter values that indicate the identified beam switching capability;
transmitting an indication of the determined one or more parameter values to the network entity; and
communicating with the network entity according to the identified beam switching capability.

12. The method of claim 11, wherein transmitting the determined one or more parameter values comprises:
transmitting the determined one or more parameter values using radio resource control signaling.

13. The method of claim 11, further comprising:
transmitting, in UE capability signaling, one or more parameter values that indicate an identified beam switching capability for each subcarrier spacing of the set of sub carrier spacings.

14. The method of claim 11, wherein the one or more parameter values indicate the beam switching capability for reception beams, transmission beams, or both.

15. A method of wireless communications at a network entity, comprising:
identifying a subcarrier spacing of a set of subcarrier spacings for communications between the network entity and a user equipment (UE);
receiving, from the UE, one or more parameter values that indicate a beam switching capability of the UE corresponding to the subcarrier spacing, wherein the one or more parameter values comprise a first parameter value indicating a quantity of beam switches and a second parameter value indicating a quantity of slots of a plurality of slots; and
communicating with the UE based at least in part on the indicated beam switching capability.

16. The method of claim 15, further comprising:
identifying the quantity of beam switches for the plurality of slots based at least in part on a reference subcarrier spacing, wherein the one or more parameter values indicate the quantity of beam switches for the plurality of slots based at least in part on the reference subcarrier spacing.

17. The method of claim 16, wherein the reference subcarrier spacing is indicated by the one or more parameter values or the reference subcarrier spacing is a default reference subcarrier spacing.

18. The method of claim 15, further comprising:
identifying the quantity of beam switches for the plurality of slots based at least in part on a reference time duration, wherein the one or more parameter values indicate the quantity of beam switches for the plurality of slots based at least in part on the reference time duration.

19. The method of claim 18, wherein the reference time duration is indicated by the one or more parameter values or the reference time duration is a default reference time duration.

20. The method of claim 18, wherein the reference time duration is a 0.125 millisecond time duration.

21. The method of claim 15, wherein receiving the one or more parameter values comprises:
receiving the one or more parameter values using radio resource control signaling.

22. The method of claim 15, further comprising:
receiving, in UE capability signaling, one or more parameter values that indicate an identified beam switching capability for each subcarrier spacing of the set of subcarrier spacings.

23. The method of claim 15, wherein a transmission time interval is a 1 millisecond subframe transmission time interval.

24. The method of claim 15, wherein the one or more parameter values indicate the quantity of reception beam switches, the quantity of transmission beam switches, or both.

25. A method of wireless communications at a network entity, comprising:
identifying a subcarrier spacing of a set of subcarrier spacings for communications between the network entity and a user equipment (UE);
receiving, from the UE, one or more parameter values that indicate a beam switching capability of the UE corresponding to the subcarrier spacing, the beam switching capability indicating a threshold quantity of symbol periods between beam switching operations associated with the subcarrier spacing, or a beam switching time for the subcarrier spacing, or both; and
communicating with the UE based at least in part on the indicated beam switching capability.

26. The method of claim 25, wherein receiving the one or more parameter values comprises:
receiving the one or more parameter values using radio resource control signaling.

27. The method of claim 25, further comprising:
receiving, in UE capability signaling, the one or more parameter values that indicate an identified beam switching capability for each subcarrier spacing of the set of subcarrier spacings.

28. The method of claim 25, wherein the one or more parameter values indicate the beam switching capability for reception beams, transmission beams, or both.

* * * * *